US012468017B2

(12) United States Patent
Cao et al.

(10) Patent No.: US 12,468,017 B2
(45) Date of Patent: Nov. 11, 2025

(54) INTEGRATED MIRROR MOTOR GALVANOMETER

(71) Applicant: Innovusion Ireland Limited, Los Altos, CA (US)

(72) Inventors: Jiayang Cao, Mountain View, CA (US); Huitao Sun, San Jose, CA (US); Yimin Li, Cupertino, CA (US); Haosen Wang, Sunnyvale, CA (US)

(73) Assignee: SEYOND, INC., Sunnyvale, CA (US)

( * ) Notice: Subject to any disclaimer, the term of this patent is extended or adjusted under 35 U.S.C. 154(b) by 994 days.

(21) Appl. No.: 17/503,204

(22) Filed: Oct. 15, 2021

(65) Prior Publication Data

US 2023/0121827 A1 Apr. 20, 2023

(51) Int. Cl.

| | |
|---|---|
| ***G01S 7/481*** | (2006.01) |
| ***G01S 17/08*** | (2006.01) |
| ***G02B 26/10*** | (2006.01) |

(52) U.S. Cl.

CPC ............ *G01S 7/4817* (2013.01); *G01S 17/08* (2013.01); *G02B 26/105* (2013.01)

(58) Field of Classification Search

CPC .............. G02B 26/105; G02B 26/0833; G02B 26/0875; G02B 26/0816; G02B 26/085; G02B 26/123; G01S 7/4817; B81B 2207/03

See application file for complete search history.

(56) References Cited

U.S. PATENT DOCUMENTS

| | | | |
|---|---|---|---|
| 3,897,150 | A | 7/1975 | Bridges et al. |
| 4,464,048 | A | 8/1984 | Farlow |
| 5,006,721 | A | 4/1991 | Cameron et al. |
| 5,157,451 | A | 10/1992 | Taboada |
| 5,319,434 | A | 6/1994 | Croteau et al. |
| 5,369,661 | A | 11/1994 | Yamaguchi et al. |
| 5,442,358 | A | 8/1995 | Keeler et al. |
| 5,546,188 | A | 8/1996 | Wangler et al. |
| 5,579,153 | A | 11/1996 | Laming et al. |
| 5,657,077 | A | 8/1997 | Deangelis et al. |
| 5,767,666 | A | 6/1998 | Asada et al. |
| 5,793,491 | A | 8/1998 | Wangler et al. |
| 5,838,239 | A | 11/1998 | Stern et al. |

(Continued)

FOREIGN PATENT DOCUMENTS

| | | | |
|---|---|---|---|
| CN | 1677050 | A | 10/2005 |
| CN | 204758260 | U | 11/2015 |

(Continued)

OTHER PUBLICATIONS

International Search Report and Written Opinion issued in International Application No. PCT/US2022/019630 dated Jul. 7, 2022, 16 pages.

(Continued)

*Primary Examiner* — Jonathan Y Jung

(74) *Attorney, Agent, or Firm* — MASCHOFF BRENNAN; Yujie Xiong; Liang Huang

(57) ABSTRACT

Embodiments discussed herein refer to an integrated mirror motor galvanometer. The integrated mirror motor galvanometer repurposes a rotor of a motor to include at least one mirror face that redirects the light pulses interfacing therewith. This way, when the rotor oscillates along its range of rotation, the at least one mirror face also oscillates.

19 Claims, 20 Drawing Sheets

(56) References Cited

U.S. PATENT DOCUMENTS 5,864,391 A 1/1999 Hosokawa et al.
5,926,259 A 7/1999 Bamberger et al.
5,936,756 A 8/1999 Nakajima
6,163,378 A 12/2000 Khoury
6,317,202 B1 11/2001 Hosokawa et al.
6,594,000 B2 7/2003 Green et al.
6,650,404 B1 11/2003 Crawford
6,950,733 B2 9/2005 Stopczynski
7,128,267 B2 10/2006 Reichenbach et al.
7,202,941 B2 4/2007 Munro
7,345,271 B2 3/2008 Boehlau et al.
7,440,084 B2 10/2008 Kane
7,440,175 B2 10/2008 Di Teodoro et al.
7,489,865 B2 2/2009 Varshineya et al.
7,576,837 B2 8/2009 Liu et al.
7,830,527 B2 11/2010 Chen et al.
7,835,068 B1 11/2010 Brooks et al.
7,847,235 B2 12/2010 Krupkin et al.
7,880,865 B2 2/2011 Tanaka et al.
7,936,448 B2 5/2011 Albuquerque et al.
7,969,558 B2 6/2011 Hall
7,982,861 B2 7/2011 Abshire et al.
8,072,582 B2 12/2011 Meneely
8,471,895 B2 6/2013 Banks
8,736,818 B2 5/2014 Weimer et al.
8,749,764 B2 6/2014 Hsu
8,812,149 B2 8/2014 Doak
8,994,928 B2 3/2015 Shiraishi
9,048,616 B1 6/2015 Robinson
9,086,273 B1 7/2015 Gruver et al.
9,194,701 B2 11/2015 Bosch
9,255,790 B2 2/2016 Zhu
9,300,321 B2 3/2016 Zalik et al.
9,304,316 B2 4/2016 Weiss et al.
9,316,724 B2 4/2016 Gehring et al.
9,354,485 B2 5/2016 Fermann et al.
9,510,505 B2 12/2016 Halloran et al.
9,575,184 B2 2/2017 Gilliland et al.
9,605,998 B2 3/2017 Nozawa
9,621,876 B2 4/2017 Federspiel
9,638,799 B2 5/2017 Goodwin et al.
9,696,426 B2 7/2017 Zuk
9,702,966 B2 7/2017 Batcheller et al.
9,804,264 B2 10/2017 Villeneuve et al.
9,823,353 B2 11/2017 Eichenholz et al.
9,869,754 B1 1/2018 Campbell et al.
9,880,263 B2 1/2018 Droz et al.
9,880,278 B2 1/2018 Uffelen et al.
9,885,778 B2 2/2018 Dussan
9,897,689 B2 2/2018 Dussan
9,915,726 B2 3/2018 Bailey et al.
9,927,915 B2 3/2018 Frame et al.
10,042,159 B2 8/2018 Dussan et al.
10,061,019 B1 8/2018 Campbell et al.
10,073,166 B2 9/2018 Dussan
10,094,925 B1 10/2018 LaChapelle
10,157,630 B2 12/2018 Vaughn et al.
10,191,155 B2 1/2019 Curatu
10,215,847 B2 2/2019 Scheim et al.
10,295,656 B1 5/2019 Li et al.
10,310,058 B1 6/2019 Campbell et al.
10,324,170 B1 6/2019 Enberg, Jr. et al.
10,324,185 B2 6/2019 McWhirter et al.
10,393,877 B2 8/2019 Hall et al.
10,429,495 B1 10/2019 Wang et al.
10,451,716 B2 10/2019 Hughes et al.
10,502,831 B2 12/2019 Eichenholz
10,557,923 B2 2/2020 Watnik et al.
10,571,567 B2 2/2020 Campbell et al.
10,578,720 B2 3/2020 Hughes et al.
10,591,600 B2 3/2020 Villeneuve et al.
10,627,491 B2 4/2020 Hall et al.
10,641,872 B2 5/2020 Dussan et al.
10,663,564 B2 5/2020 LaChapelle
10,663,585 B2 5/2020 McWhirter
10,663,596 B2 5/2020 Dussan et al.
10,684,360 B2 6/2020 Campbell
10,908,262 B2 2/2021 Dussan
10,969,475 B2 4/2021 Li et al.
10,983,218 B2 4/2021 Hall et al.
11,002,835 B2 5/2021 Pan et al.
11,009,605 B2 5/2021 Li et al.
2002/0136251 A1 9/2002 Green et al.
2004/0135992 A1 7/2004 Munro
2005/0033497 A1 2/2005 Stopczynski
2005/0190424 A1 9/2005 Reichenbach et al.
2005/0195383 A1 9/2005 Breed et al.
2006/0071846 A1 4/2006 Yanagisawa et al.
2006/0132752 A1 6/2006 Kane
2007/0091948 A1 4/2007 Di Teodoro et al.
2007/0195279 A1* 8/2007 Park ...................... G09G 3/002 353/69
2007/0216995 A1 9/2007 Bollond et al.
2008/0174762 A1 7/2008 Liu et al.
2008/0193135 A1 8/2008 Du et al.
2009/0010644 A1 1/2009 Varshneya et al.
2009/0051926 A1 2/2009 Chen
2009/0059201 A1 3/2009 Willner et al.
2009/0067453 A1 3/2009 Mizuuchi et al.
2009/0147239 A1 6/2009 Zhu
2009/0262760 A1 10/2009 Krupkin et al.
2009/0316134 A1 12/2009 Michael et al.
2010/0006760 A1 1/2010 Lee et al.
2010/0020306 A1 1/2010 Hall
2010/0027602 A1 2/2010 Abshire et al.
2010/0045965 A1 2/2010 Meneely
2010/0053715 A1 3/2010 O'Neill et al.
2010/0128109 A1 5/2010 Banks
2010/0271614 A1 10/2010 Albuquerque et al.
2011/0181864 A1 7/2011 Schmitt et al.
2011/0194098 A1* 8/2011 Goto ...................... G01S 17/08 356/4.01
2012/0038903 A1 2/2012 Weimer et al.
2012/0124113 A1 5/2012 Zalik et al.
2012/0221142 A1 8/2012 Doak
2013/0107016 A1 5/2013 Federspeil
2013/0116971 A1 5/2013 Retkowski et al.
2013/0241761 A1 9/2013 Cooper et al.
2013/0293867 A1 11/2013 Hsu et al.
2013/0293946 A1 11/2013 Fermann et al.
2013/0329279 A1 12/2013 Nati et al.
2013/0342822 A1 12/2013 Shiraishi
2014/0078514 A1 3/2014 Zhu
2014/0104594 A1 4/2014 Gammenthaler
2014/0347650 A1 11/2014 Bosch
2014/0350836 A1 11/2014 Stettner et al.
2015/0078123 A1 3/2015 Batcheller et al.
2015/0084805 A1 3/2015 Dawber
2015/0109603 A1 4/2015 Kim et al.
2015/0116692 A1 4/2015 Zuk et al.
2015/0139259 A1 5/2015 Robinson
2015/0158489 A1 6/2015 Oh et al.
2015/0338270 A1 11/2015 Williams et al.
2015/0355327 A1 12/2015 Goodwin et al.
2016/0003946 A1 1/2016 Gilliland et al.
2016/0047896 A1 2/2016 Dussan
2016/0047900 A1 2/2016 Dussan
2016/0061655 A1 3/2016 Nozawa
2016/0061935 A1 3/2016 Mccloskey et al.
2016/0100521 A1 4/2016 Halloran et al.
2016/0117048 A1 4/2016 Frame et al.
2016/0172819 A1 6/2016 Ogaki
2016/0178736 A1 6/2016 Chung
2016/0226210 A1 8/2016 Zayhowski et al.
2016/0245902 A1 8/2016 Natnik
2016/0291134 A1 10/2016 Droz et al.
2016/0313445 A1 10/2016 Bailey et al.
2016/0327646 A1 11/2016 Scheim et al.
2017/0003116 A1 1/2017 Yee et al.
2017/0153319 A1 6/2017 Villeneuve et al.
2017/0242104 A1 8/2017 Dussan
2017/0299721 A1 10/2017 Eichenholz et al.
2017/0307738 A1 10/2017 Schwarz et al.
2017/0365105 A1 12/2017 Rao et al.

(56) References Cited

U.S. PATENT DOCUMENTS

| | | | |
|---|---|---|---|
| 2018/0040171 A1 | 2/2018 | Kundu et al. | |
| 2018/0050704 A1 | 2/2018 | Tascione et al. | |
| 2018/0069367 A1 | 3/2018 | Villeneuve et al. | |
| 2018/0152691 A1 | 5/2018 | Pacala et al. | |
| 2018/0156896 A1 | 6/2018 | O'Keeffe | |
| 2018/0158471 A1 | 6/2018 | Vaughn et al. | |
| 2018/0164439 A1 | 6/2018 | Droz et al. | |
| 2018/0188355 A1 | 7/2018 | Bao et al. | |
| 2018/0188357 A1 | 7/2018 | Li et al. | |
| 2018/0188358 A1 | 7/2018 | Li et al. | |
| 2018/0188371 A1 | 7/2018 | Bao et al. | |
| 2018/0210084 A1 | 7/2018 | Zwölfer et al. | |
| 2018/0275274 A1 | 9/2018 | Bao et al. | |
| 2018/0284241 A1 | 10/2018 | Campbell et al. | |
| 2018/0284242 A1 | 10/2018 | Campbell | |
| 2018/0284286 A1 | 10/2018 | Eichenholz et al. | |
| 2018/0329060 A1 | 11/2018 | Pacala et al. | |
| 2018/0359460 A1 | 12/2018 | Pacala et al. | |
| 2019/0025428 A1 | 1/2019 | Li et al. | |
| 2019/0107607 A1 | 4/2019 | Danziger | |
| 2019/0107623 A1 | 4/2019 | Campbell et al. | |
| 2019/0120942 A1 | 4/2019 | Zhang et al. | |
| 2019/0120962 A1 | 4/2019 | Gimpel et al. | |
| 2019/0154804 A1 | 5/2019 | Eichenholz | |
| 2019/0154807 A1 | 5/2019 | Steinkogler et al. | |
| 2019/0196308 A1* | 6/2019 | Chang | G02B 7/005 |
| 2019/0212416 A1 | 7/2019 | Li et al. | |
| 2019/0250254 A1 | 8/2019 | Campbell et al. | |
| 2019/0257924 A1 | 8/2019 | Li et al. | |
| 2019/0265334 A1 | 8/2019 | Zhang et al. | |
| 2019/0265336 A1 | 8/2019 | Zhang et al. | |
| 2019/0265337 A1 | 8/2019 | Zhang et al. | |
| 2019/0265339 A1 | 8/2019 | Zhang et al. | |
| 2019/0277952 A1 | 9/2019 | Beuschel et al. | |
| 2019/0310368 A1 | 10/2019 | LaChapelle | |
| 2019/0369215 A1 | 12/2019 | Wang et al. | |
| 2019/0369258 A1 | 12/2019 | Hall et al. | |
| 2019/0383915 A1 | 12/2019 | Li et al. | |
| 2020/0142070 A1 | 5/2020 | Hall et al. | |
| 2020/0150247 A1* | 5/2020 | Ledbetter | G02B 26/123 |
| 2020/0256964 A1 | 8/2020 | Campbell et al. | |
| 2020/0284906 A1 | 9/2020 | Eichenholz et al. | |
| 2020/0319310 A1 | 10/2020 | Hall et al. | |
| 2020/0381156 A1* | 12/2020 | Duan | H01F 7/1615 |
| 2020/0400798 A1 | 12/2020 | Rezk et al. | |
| 2021/0088630 A9 | 3/2021 | Zhang | |
| 2021/0294094 A1* | 9/2021 | Wakabayashi | G02B 27/141 |

FOREIGN PATENT DOCUMENTS

| | | |
|---|---|---|
| CN | 204885804 U | 12/2015 |
| EP | 0 757 257 B1 | 2/1997 |
| EP | 1 237 305 A2 | 9/2002 |
| EP | 1 923 721 A1 | 5/2008 |
| EP | 2 157 445 A2 | 2/2010 |
| EP | 2 395 368 A1 | 12/2011 |
| EP | 2 889 642 A1 | 7/2015 |
| GB | 1 427 164 A | 3/1976 |
| GB | 2000411 | 1/1979 |
| JP | 2004-13104 A | 1/2004 |
| JP | 2007144667 A | 6/2007 |
| JP | 2010035385 A | 2/2010 |
| JP | 2017-003347 A | 1/2017 |
| JP | 2017-138301 A | 8/2017 |
| KR | 10-2012-0013515 A | 2/2012 |
| KR | 10-2013-0068224 A | 6/2013 |
| KR | 10-2018-0107673 A | 10/2018 |
| WO | 2017/110417 A1 | 6/2017 |
| WO | 2018/125725 A1 | 7/2018 |
| WO | 2018129408 A1 | 7/2018 |
| WO | 2018129409 A1 | 7/2018 |
| WO | 2018129410 A1 | 7/2018 |
| WO | 2018175990 | 9/2018 |
| WO | 2018182812 A2 | 10/2018 |
| WO | 2019079642 | 4/2019 |
| WO | 2019165095 | 8/2019 |
| WO | 2019165289 A1 | 8/2019 |
| WO | 2019165294 | 8/2019 |
| WO | 2020013890 A2 | 1/2020 |

OTHER PUBLICATIONS

Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.

Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.

International Preliminary Report on Patentability, dated Jul. 9, 2019, for International Application No. PCT/US2018/012703, 10 pages.

International Preliminary Report on Patentability, dated Jul. 9, 2019, for International Application No. PCT/US2018/012704, 7 pages.

International Preliminary Report on Patentability, dated Jul. 9, 2019, for International Application No. PCT/US2018/012705, 7 pages.

International Search Report and Written Opinion, dated Jan. 17, 2020, for International Application No. PCT/US2019/019276, 14 pages.

International Search Report and Written Opinion, dated Jul. 9, 2019, for International Application No. PCT/US2019/018987, 17 pages.

International Search Report and Written Opinion, dated Sep. 18, 2018, for International Application No. PCT/US2018/012116, 12 pages.

International Search Report and Written Opinion, dated May 3, 2019, for International Application No. PCT/US2019/019272, 16 pages.

International Search Report and Written Opinion, dated May 6, 2019, for International Application No. PCT/US2019/019264, 15 pages.

International Search Report and Written Opinion, dated Jan. 3, 2019, for International Application No. PCT/US2018/056577, 15 pages.

International Search Report and Written Opinion, dated Mar. 23, 2018, for International Application No. PCT/US2018/012704, 12 pages.

International Search Report and Written Opinion, dated Jun. 7, 2018, for International Application No. PCT/US2018/024185, 9 pages.

International Preliminary Report on Patentability, dated Apr. 30, 2020, for International Application No. PCT/US2018/056577, 8 pages.

European Search Report, dated Jul. 17, 2020, for EP Application No. 18776977.3, 12 pages.

Extended European Search Report, dated Jul. 10, 2020, for EP Application No. 18736738.8, 9 pages.

Gunzung, Kim, et al. (Mar. 2, 2016). "A hybrid 3D LIDAR imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.

Extended European Search Report, dated Jul. 22, 2020, for EP Application No. 18736685.1, 10 pages.

Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.

Office Action Issued in Japanese Patent Application No. 2019-536019 dated Nov. 30, 2021, 6 pages.

European Search Report, dated Jun. 17, 2021, for EP Application No. 18868896.4, 7 pages.

"Fiber laser," Wikipedia, https://en.wikipedia.org/wiki/Fiber_laser, 6 pages.

International Search Report and Written Opinion, dated Mar. 19, 2018, for International Application No. PCT/US2018/012705, 12 pages.

(56) References Cited

OTHER PUBLICATIONS

International Search Report and Written Opinion, dated Mar. 20, 2018, for International Application No. PCT/US2018/012703, 13 pages.
"Mirrors", Physics LibreTexts, https://phys.libretexts.org/Bookshelves/Optics/Supplemental_Modules_(Components)/Mirrors, (2021), 2 pages.
"Why Wavelengths Matter in Fiber Optics", FirstLight, https://www.firstlight.net/why-wavelengths-matter-in-fiber-optics/, (2021), 5 pages.

* cited by examiner

INTEGRATED MIRROR MOTOR GALVANOMETER

FIELD OF THE INVENTION

The present disclosure relates generally to laser scanning and, more particularly, to using a galvanometer to redirect laser pulses.

BACKGROUND

Systems exist that enable vehicles to be driven semi-autonomously or fully autonomously. Such systems may use one or more range finding, mapping, or object detection systems to provide sensory input to assist in semi-autonomous or fully autonomous vehicle control. Light detection and ranging (LiDAR) systems, for example, can provide the sensory input required by a semi-autonomous or fully autonomous vehicle. LiDAR systems use light pulses to create an image or point cloud of the external environment. Some typical LiDAR systems include a light source, a pulse steering system, and light detector. The light source generates light pulses that are directed by the pulse steering system in particular directions when being transmitted from the LiDAR system. When a transmitted light pulse is scattered by an object, some of the scattered light is returned to the LiDAR system as a returned pulse. The light detector detects the returned pulse. Using the time it took for the returned pulse to be detected after the light pulse was transmitted and the speed of light, the LiDAR system can determine the distance to the object along the path of the transmitted light pulse. The pulse steering system can direct light pulses along different paths to allow the LiDAR system to scan the surrounding environment and produce an image or point cloud. LiDAR systems can also use techniques other than time-of-flight and scanning to measure the surrounding environment.

BRIEF SUMMARY

Embodiments discussed herein refer to an integrated mirror motor galvanometer. The integrated mirror motor galvanometer repurposes a rotor of a motor to include a mirror face that redirects the light pulses interfacing therewith. Thus, when the rotor oscillates, so does its mirror face.

A further understanding of the nature and advantages of the embodiments discussed herein may be realized by reference to the remaining portions of the specification and the drawings.

DETAILED DESCRIPTION

Figure 1:
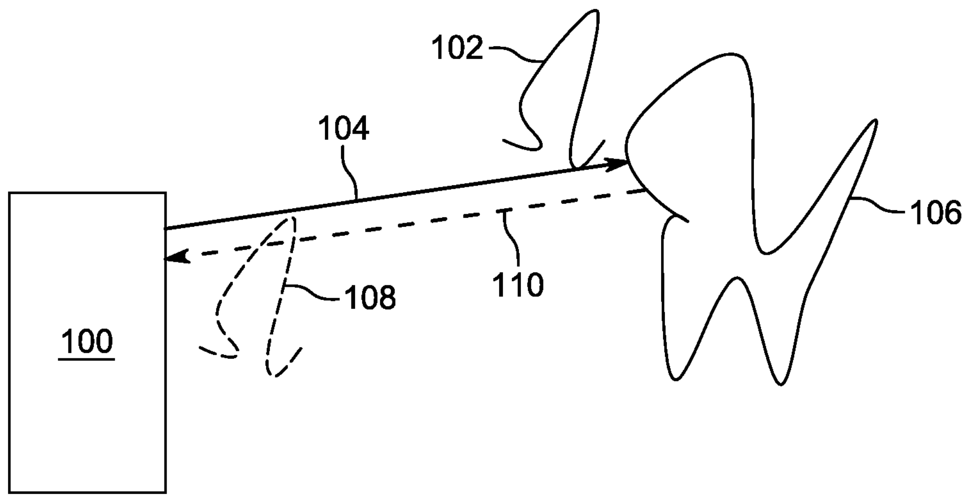
FIGS. 1-3 illustrate an exemplary LiDAR system using pulse signal to measure distances to points in the outside environment.

Illustrative embodiments are now described more fully hereinafter with reference to the accompanying drawings, in which representative examples are shown. Indeed, the disclosed LiDAR systems and methods may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

Some light detection and ranging (LiDAR) systems use a single light source to produce one or more light signals of a single wavelength that scan the surrounding environment. The signals are scanned using steering systems that direct the pulses in one or two dimensions to cover an area of the surrounding environment (the scan area). When these systems use mechanical means to direct the pulses, the system complexity increases because more moving parts are required. Additionally, only a single signal can be emitted at any one time because two or more identical signals would introduce ambiguity in returned signals. In some embodiments of the present technology, these disadvantages and/or others are overcome.

For example, some embodiments of the present technology use one or more light sources that produce light signals of different wavelengths and/or along different optical paths. These light sources provide the signals to a signal steering system at different angles so that the scan areas for the light signals are different (e.g., if two light sources are used to create two light signals, the scan area associated with each light source is different). This allows for tuning the signals to appropriate transmitting powers and the possibility of having overlapping scan areas that cover scans of different distances. Longer ranges can be scanned with signals having higher power and/or slower repetition rate (e.g., when using pulsed light signals). Shorter ranges can be scanned with signals having lower power and/or high repetition rate (e.g., when using pulsed light signals) to increase the point density in a point cloud.

As another example, some embodiments of the present technology use signal steering systems with one or more dispersion elements (e.g., gratings, optical combs, prisms, etc.) to direct pulsed signals based on the wavelength of the pulse. A dispersion element can make fine adjustments to a pulse's optical path, which may be difficult or impossible with mechanical systems. Additionally, using one or more dispersion elements allows the signal steering system to use few mechanical components to achieve the desired scanning capabilities. This results in a simpler, more efficient (e.g., lower power) design that is potentially more reliable (due to few moving components).

Some LiDAR systems use the time-of-flight of light signals (e.g., light pulses) to determine the distance to objects in the path of the light. For example, with respect to FIG. 1, an exemplary LiDAR system 100 includes a laser light source (e.g., a fiber laser), a steering system (e.g., a system of one or more moving mirrors), and a light detector (e.g., a photon detector with one or more optics). LiDAR system 100 transmits light pulse 102 along path 104 as determined by the steering system of LiDAR system 100. In the depicted example, light pulse 102, which is generated by the laser light source, is a short pulse of laser light. Further, the signal steering system of the LiDAR system 100 is a pulse signal steering system. However, it should be appreciated that LiDAR systems can operate by generating, transmitting, and detecting light signals that are not pulsed. Light signals that are not pulsed can be used to derive ranges to object in the surrounding environment using techniques other than time-of-flight. For example, some LiDAR systems use frequency modulated continuous waves (i.e., "FMCW"). It should be further appreciated that any of the techniques described herein with respect to time-of-flight based systems that use pulses also may be applicable to LiDAR systems that do not use one or both of these techniques.

Referring back to FIG. 1 (a time-of-flight LiDAR system that uses light pulses) when light pulse 102 reaches object 106, light pulse 102 scatters and returned light pulse 108 will be reflected back to system 100 along path 110. The time from when transmitted light pulse 102 leaves LiDAR system 100 to when returned light pulse 108 arrives back at LiDAR system 100 can be measured (e.g., by a processor or other electronics within the LiDAR system). This time-of-flight combined with the knowledge of the speed of light can be used to determine the range/distance from LiDAR system 100 to the point on object 106 where light pulse 102 scattered.

Figure 2:
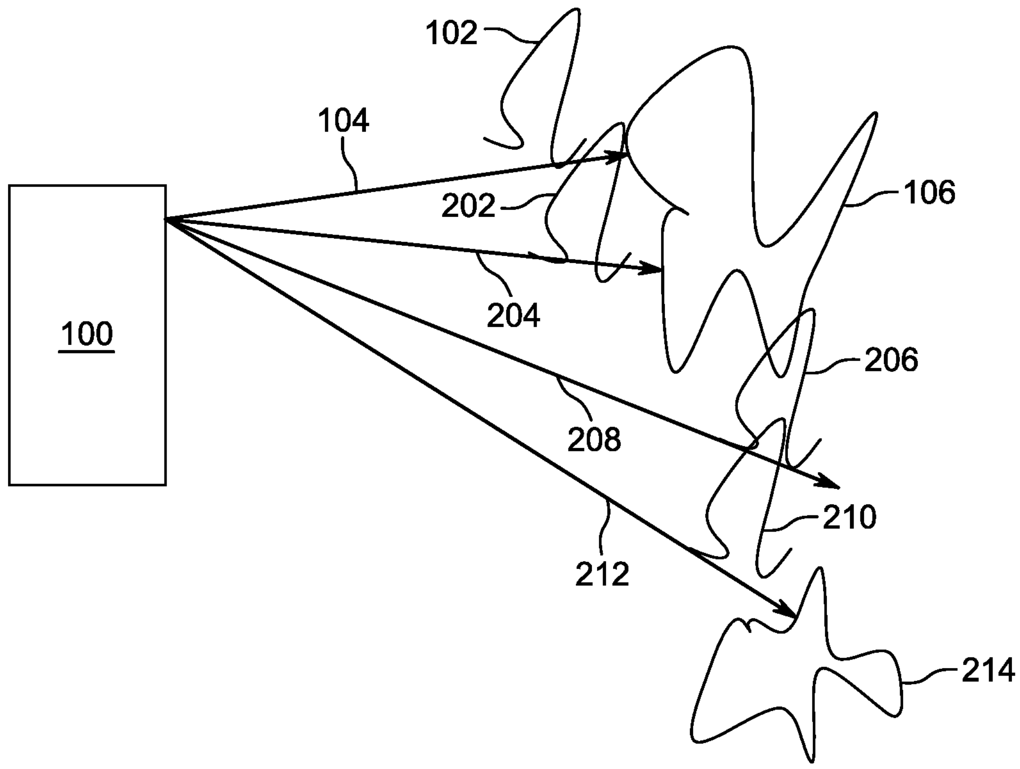
Figure 3:
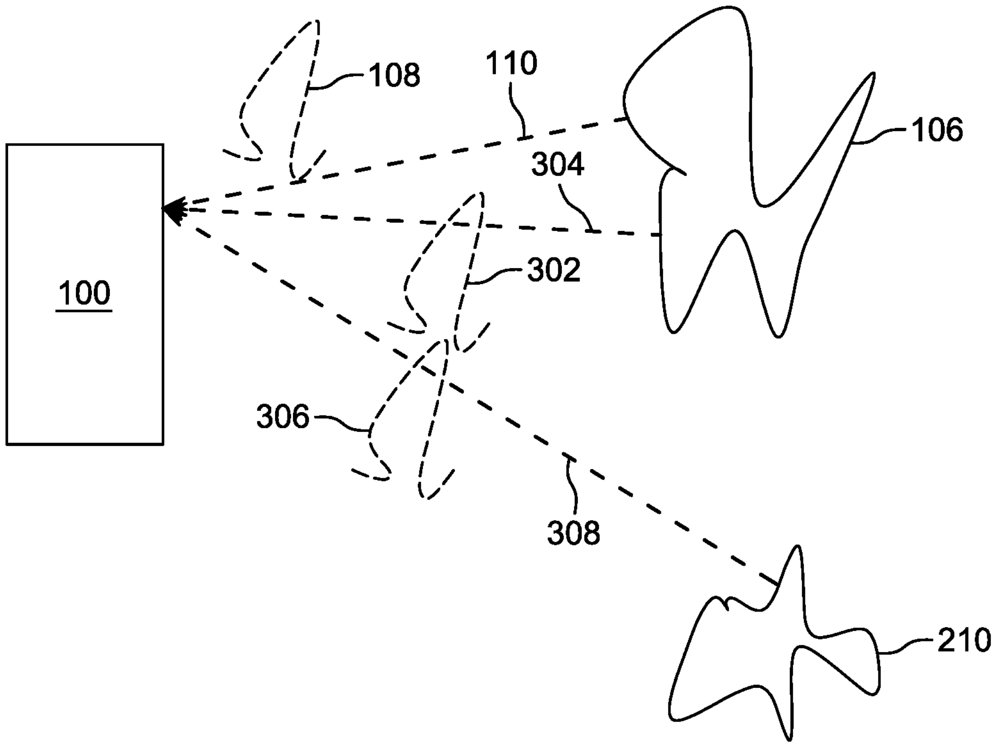

By directing many light pulses, as depicted in FIG. 2, LiDAR system 100 scans the external environment (e.g., by directing light pulses 102, 202, 206, 210 along paths 104, 204, 208, 212, respectively). As depicted in FIG. 3, LiDAR system 100 receives returned light pulses 108, 302, 306 (which correspond to transmitted light pulses 102, 202, 210, respectively) back after objects 106 and 214 scatter the transmitted light pulses and reflect pulses back along paths 110, 304, 308, respectively. Based on the direction of the transmitted light pulses (as determined by LiDAR system 100) as well as the calculated range from LiDAR system 100 to the points on objects that scatter the light pulses (e.g., the points on objects 106 and 214), the surroundings within the detection range (e.g., the field of view between path 104 and 212, inclusively) can be precisely plotted (e.g., a point cloud or image can be created).

If a corresponding light pulse is not received for a particular transmitted light pulse, then it can be determined that there are no objects that can scatter sufficient amount of signal for the LiDAR light pulse within a certain range of LiDAR system 100 (e.g., the max scanning distance of LiDAR system 100). For example, in FIG. 2, light pulse 206 will not have a corresponding returned light pulse (as depicted in FIG. 3) because it did not produce a scattering event along its transmission path 208 within the predetermined detection range. LiDAR system 100 (or an external system communication with LiDAR system 100) can interpret this as no object being along path 208 within the detection range of LiDAR system 100.

In FIG. 2, transmitted light pulses 102, 202, 206, 210 can be transmitted in any order, serially, in parallel, or based on other timings with respect to each other. Additionally, while FIG. 2 depicts a 1-dimensional array of transmitted light pulses, LiDAR system 100 optionally also directs similar arrays of transmitted light pulses along other planes so that a 2-dimensional array of light pulses is transmitted. This 2-dimensional array can be transmitted point-by-point, line-by-line, all at once, or in some other manner. The point cloud or image from a 1-dimensional array (e.g., a single horizontal line) will produce 2-dimensional information (e.g., (1) the horizontal transmission direction and (2) the range to objects). The point cloud or image from a 2-dimensional array will have 3-dimensional information (e.g., (1) the horizontal transmission direction, (2) the vertical transmission direction, and (3) the range to objects).

The density of points in point cloud or image from a LiDAR system 100 is equal to the number of pulses divided by the field of view. Given that the field of view is fixed, to increase the density of points generated by one set of transmission-receiving optics, the LiDAR system should fire a pulse more frequently, in other words, a light source with a higher repetition rate is needed. However, by sending pulses more frequently the farthest distance that the LiDAR system can detect may be more limited. For example, if a returned signal from a far object is received after the system transmits the next pulse, the return signals may be detected in a different order than the order in which the corresponding signals are transmitted and get mixed up if the system cannot correctly correlate the returned signals with the transmitted signals. To illustrate, consider an exemplary LiDAR system that can transmit laser pulses with a repetition rate between 500 kHz and 1 MHz. Based on the time it takes for a pulse to return to the LiDAR system and to avoid mix-up of returned pulses from consecutive pulses in conventional LiDAR design, the farthest distance the LiDAR system can detect may be 300 meters and 150 meters for 500 kHz and 1 MHz, respectively. The density of points of a LiDAR system with 500 kHz repetition rate is half of that with 1 MHz. Thus, this example demonstrates that, if the system cannot correctly correlate returned signals that arrive out of order, increasing the repetition rate from 500 kHz to 1 MHz (and thus improving the density of points of the system) would reduce the detection range of the system.

Figure 4:
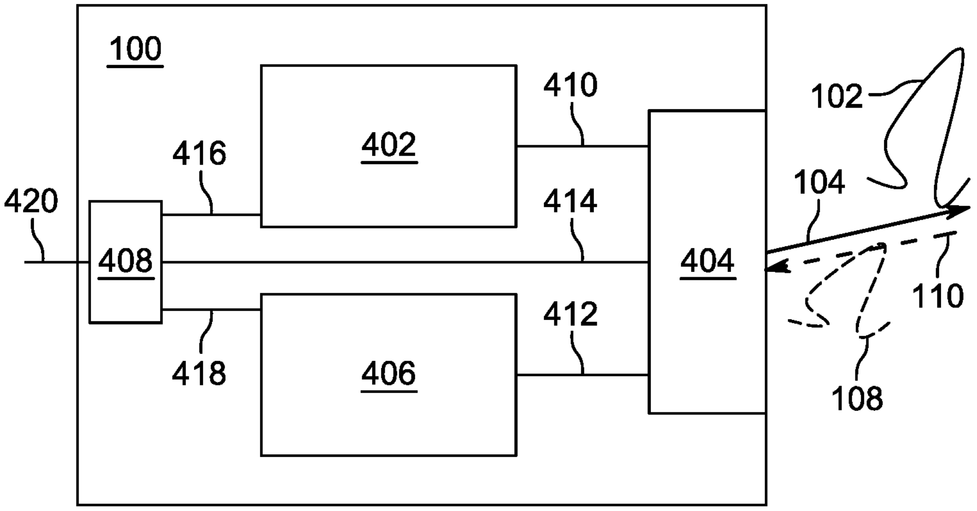
FIG. 4 depicts a logical block diagram of the exemplary LiDAR system.

FIG. 4 depicts a logical block diagram of LiDAR system 100, which includes light source 402, signal steering system

404, pulse detector 406, and controller 408. These components are coupled together using communications paths 410, 412, 414, 416, and 418. These communications paths represent communication (bidirectional or unidirectional) among the various LiDAR system components but need not be physical components themselves. While the communications paths can be implemented by one or more electrical wires, busses, or optical fibers, the communication paths can also be wireless channels or open-air optical paths so that no physical communication medium is present. For example, in one exemplary LiDAR system, communication path 410 is one or more optical fibers, communication path 412 represents an optical path, and communication paths 414, 416, 418, and 420 are all one or more electrical wires that carry electrical signals. The communications paths can also include more than one of the above types of communication mediums (e.g., they can include an optical fiber and an optical path or one or more optical fibers and one or more electrical wires).

LiDAR system 100 can also include other components not depicted in FIG. 4, such as power buses, power supplies, LED indicators, switches, etc. Additionally, other connections among components may be present, such as a direct connection between light source 402 and light detector 406 so that light detector 406 can accurately measure the time from when light source 402 transmits a light pulse until light detector 406 detects a returned light pulse.

Signal steering system 404 can include one or more mirrors that redirect light pulses originating from light source to a FOV of LiDAR system 100. For example, in one embodiment, signal steering system 404 can include a galvanometer and a polygon. In this embodiment, the galvanometer may be responsible for controlling redirection of light pulses according to a first axis (e.g., Y axis) of the FOV and the polygon may be responsible for controlling redirection of light pulses according to a second axis (e.g., X axis) of the FOV. In another embodiment, signal steering system 404 can include a galvanometer and a single source, multi-beam (SSMB) splitter. Additional details of SSMB splitters and how they can be used with another mirror (e.g., such as a galvanometer according to embodiments discussed herein) can be found in U.S. patent application Ser. No. 16/777,059, filed Jan. 30, 2020, entitled "MULTIPLE BEAM GENERATION FROM A SINGLE SOURCE BEAM FOR USE WITH A LIDAR SYSTEM," the content of which is hereby incorporated by reference in its entirety.

Embodiments discussed herein refer to galvanometers that integrate a mirror and a motor together to provide an integrated mirror motor galvanometer. The integrated mirror motor galvanometer eliminates issues experienced by conventional galvanometers that use a motor and a mirror as separate and discreet components. For example, conventional galvanometers can suffer torsion and twisting issues, and can be susceptible to vibration. Such issues can affect the redirection accuracy of the light pulses. The galvanometer according to embodiments discussed herein repurposes a rotor of a motor to include at least one mirror face that redirects the light pulses interfacing therewith. This way, when the rotor oscillates along its range of rotation, the at least one mirror face also oscillates. This provides an integrated solution that eliminates issues commonly associated with conventional galvanometers.

Figure 5A:
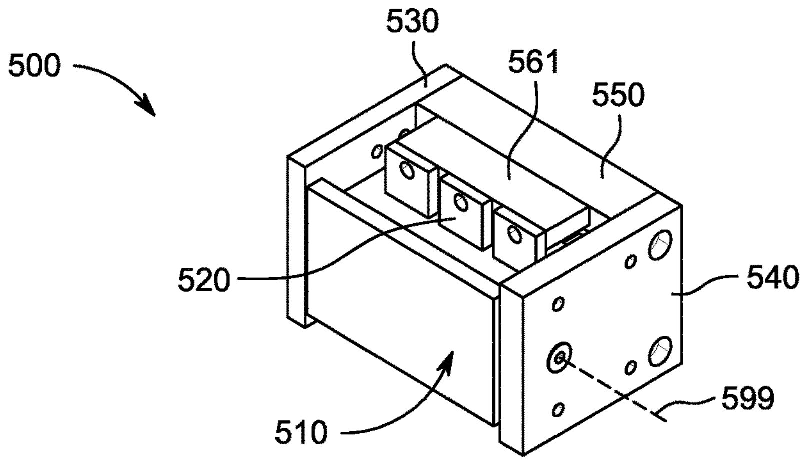
FIGS. 5A-5C show perspective views of integrated mirror motor galvanometer, according to an embodiment.
Figure 5B:
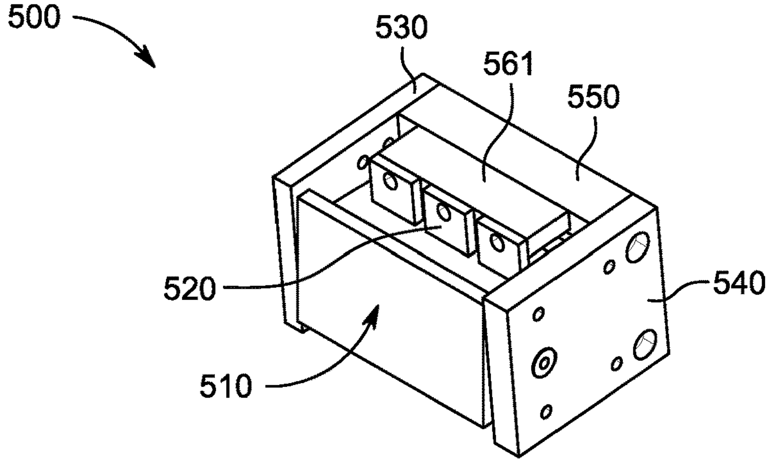
Figure 5C:
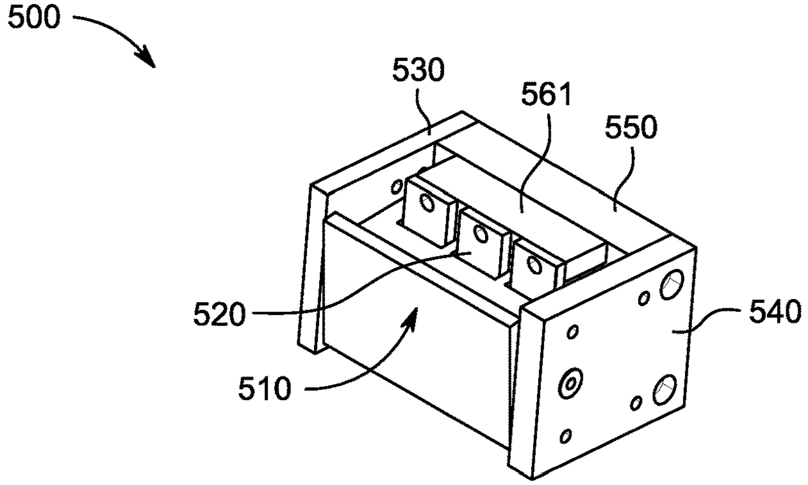
Figure 6A:
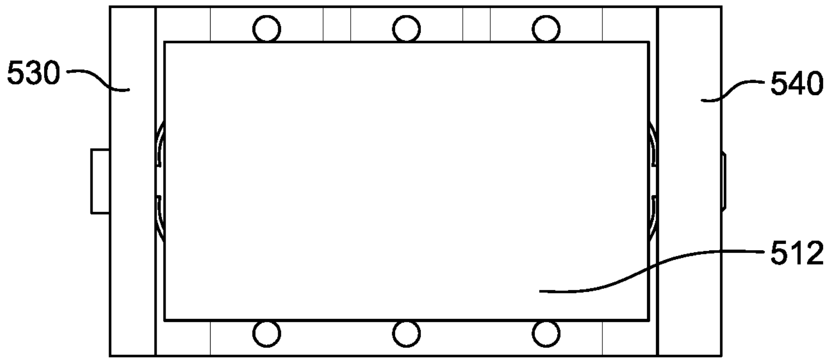
FIGS. 6A-6E show illustrative front, back, right, top, and bottom views of a galvanometer according to an embodiment.
Figure 6B:
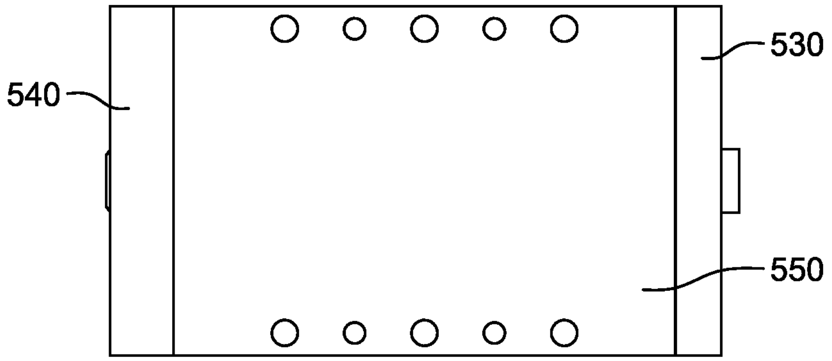
Figure 6C:
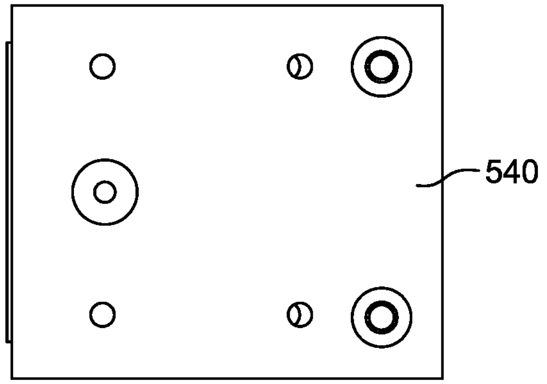
Figure 6D:
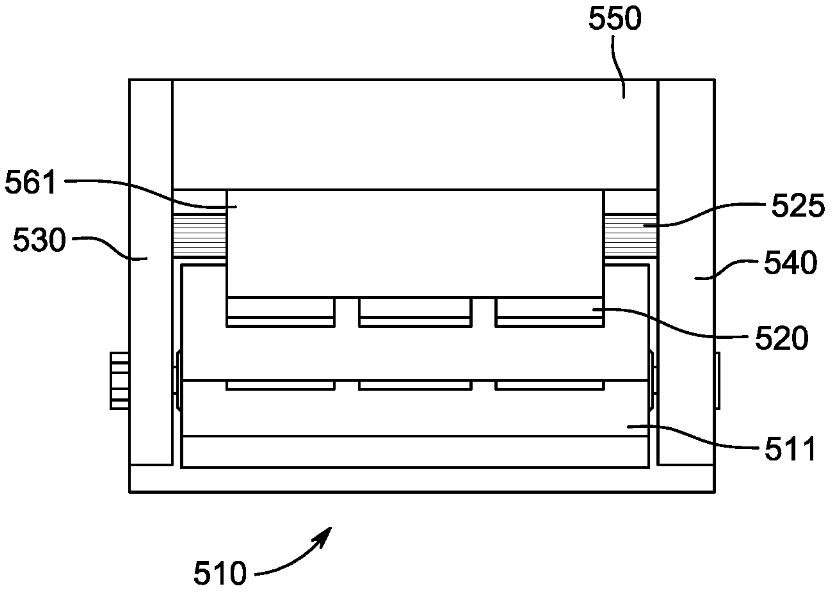
Figure 6E:
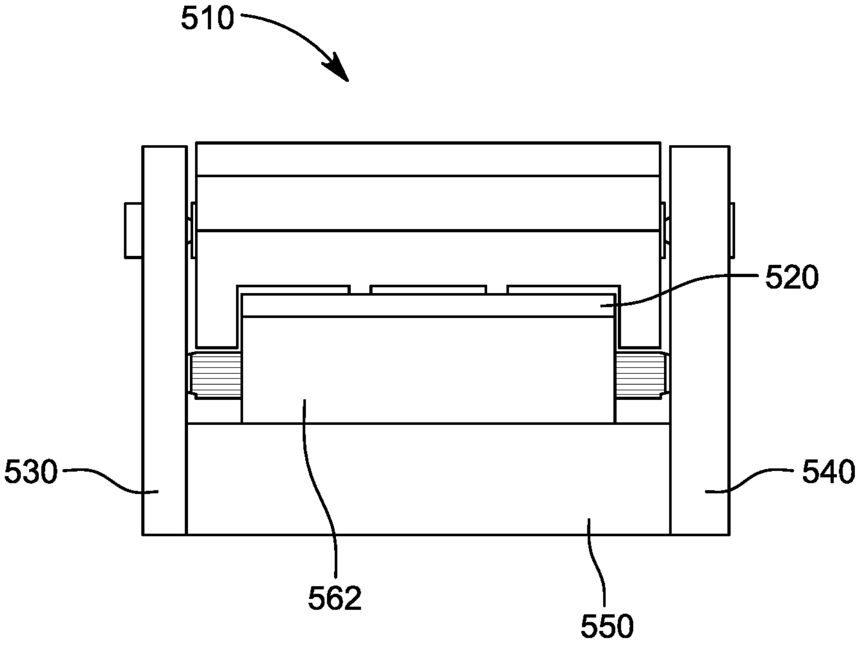

FIGS. 5A-5C show perspective views of integrated mirror motor galvanometer 500 arranged in different positions according to an embodiment. In particular, FIGS. 5A-5C show galvanometer 500 in a neutral position, a positive degree position, and a negative degree position, respectively. Galvanometer 500 may rotate between the positive degree and negative degree positions as it oscillates back and forth. This oscillation changes a re-direction angle of any light pulses being provided to mirror face 512 (shown in FIG. 6A) and enables a scanning system (that uses galvanometer 500) to direct the light pulses to the FOV of the LiDAR system.

Figure 7:
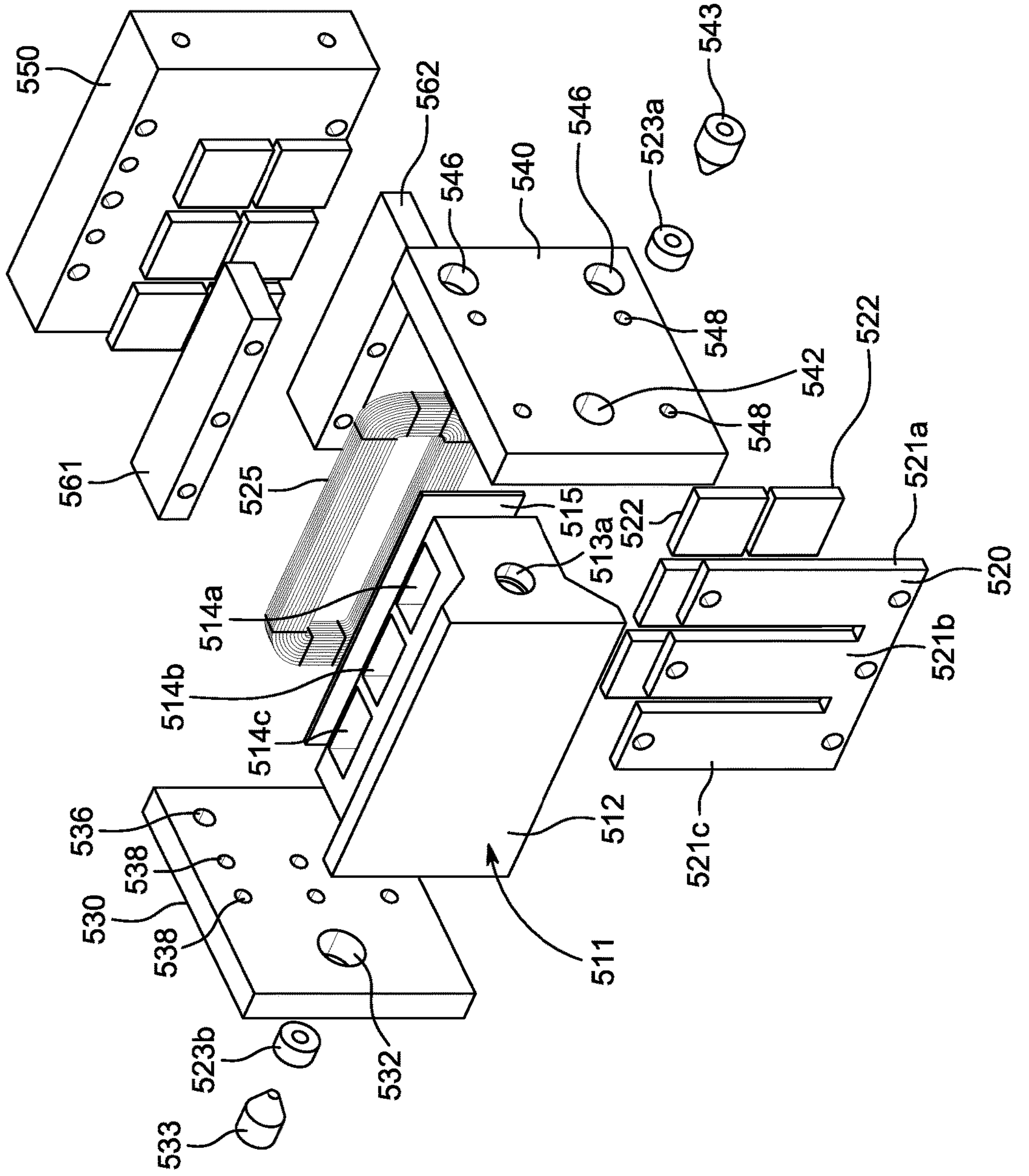
FIG. 7 shows illustrative exploded view of a galvanometer according to an embodiment.
Figure 8A:
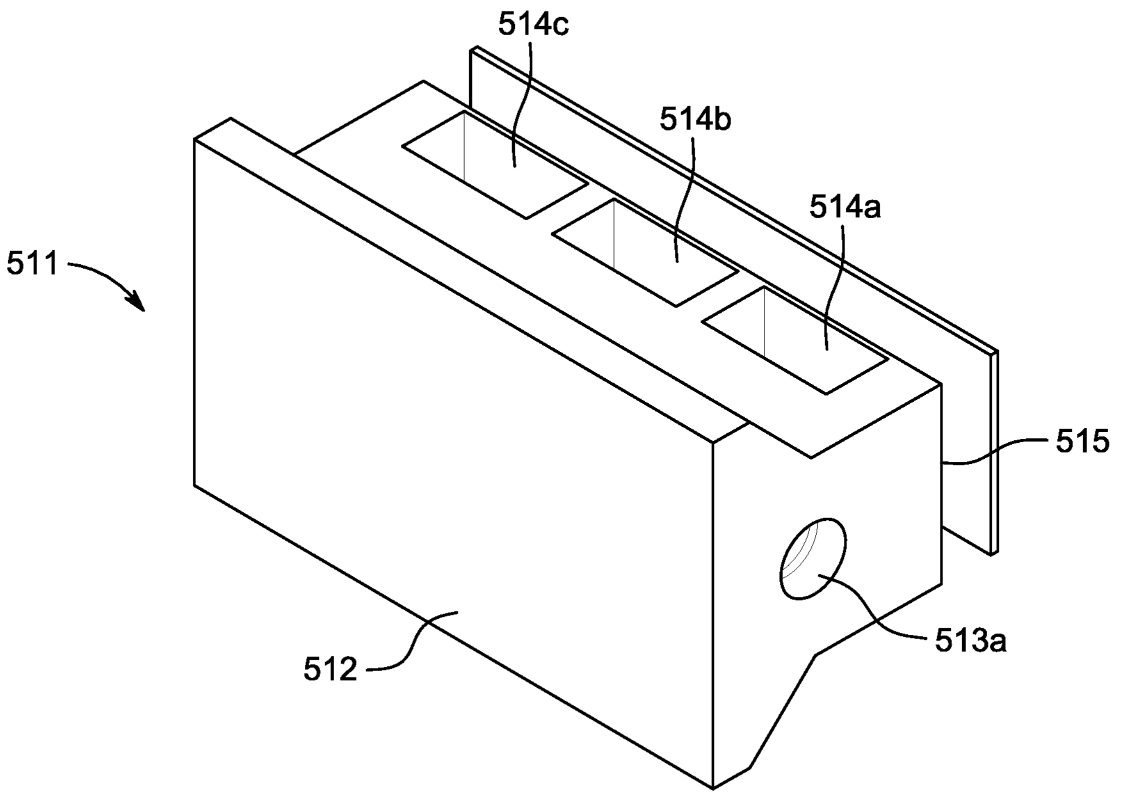
FIGS. 8A-8F shows different views of a mirror rotor according to an embodiment.
Figure 8B:
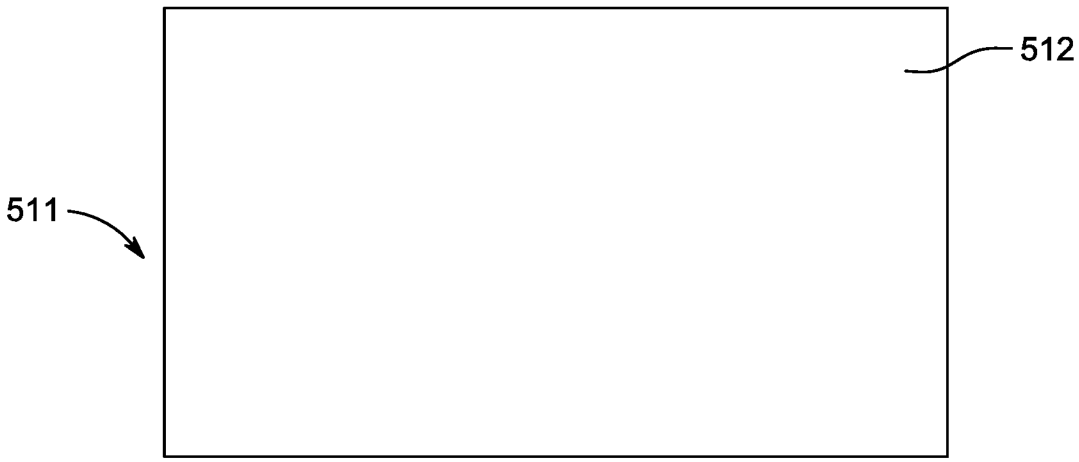
Figure 8C:
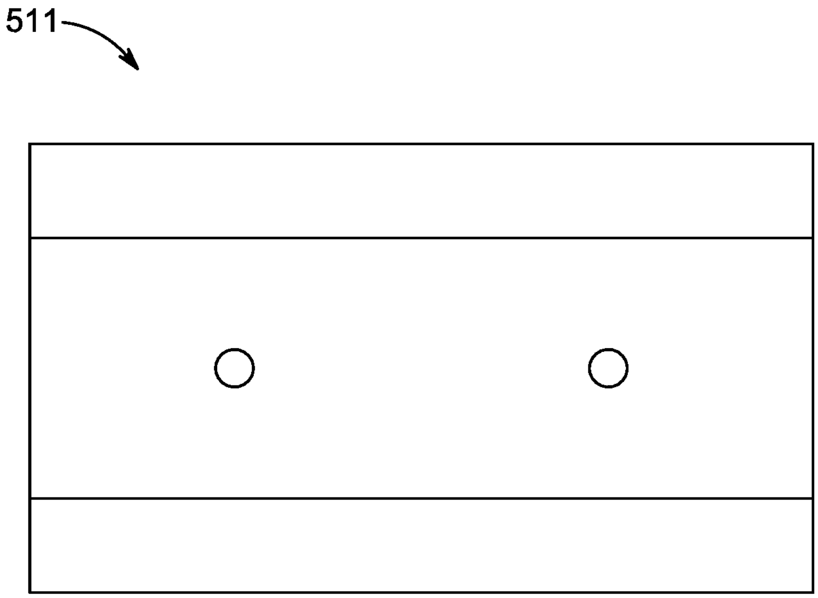
Figure 8D:
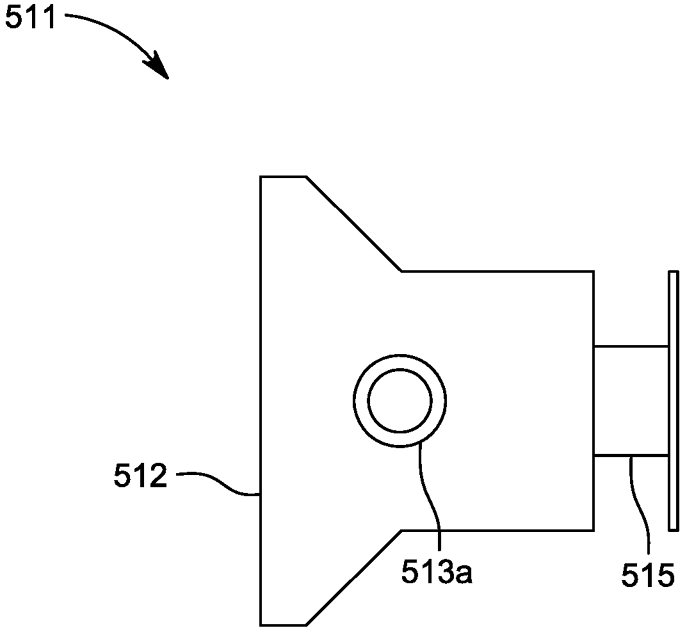
Figure 8E:
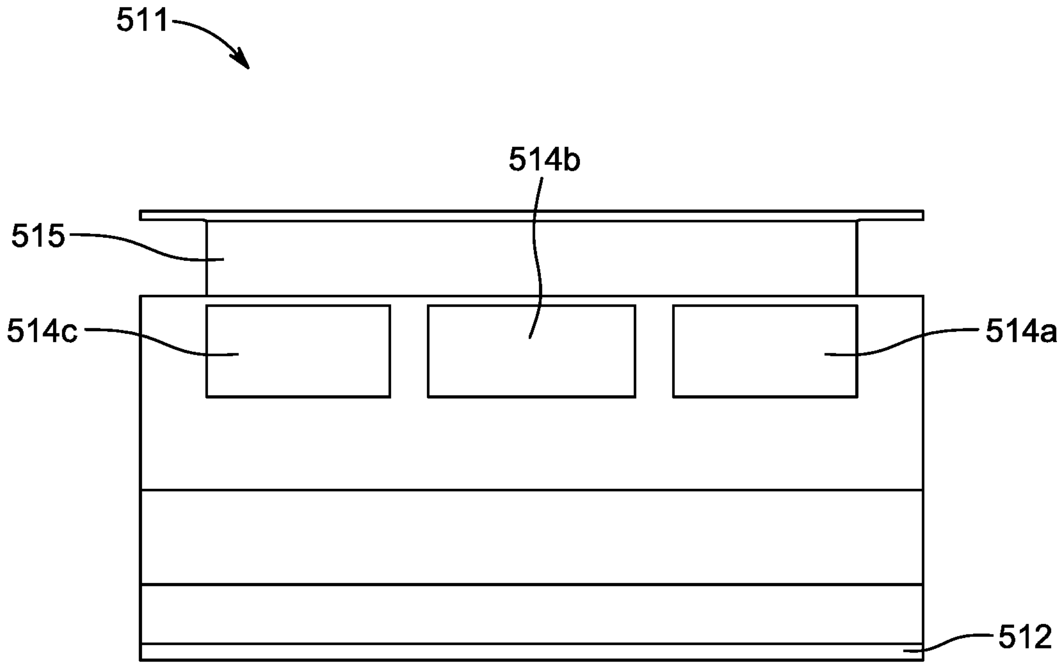
Figure 8F:
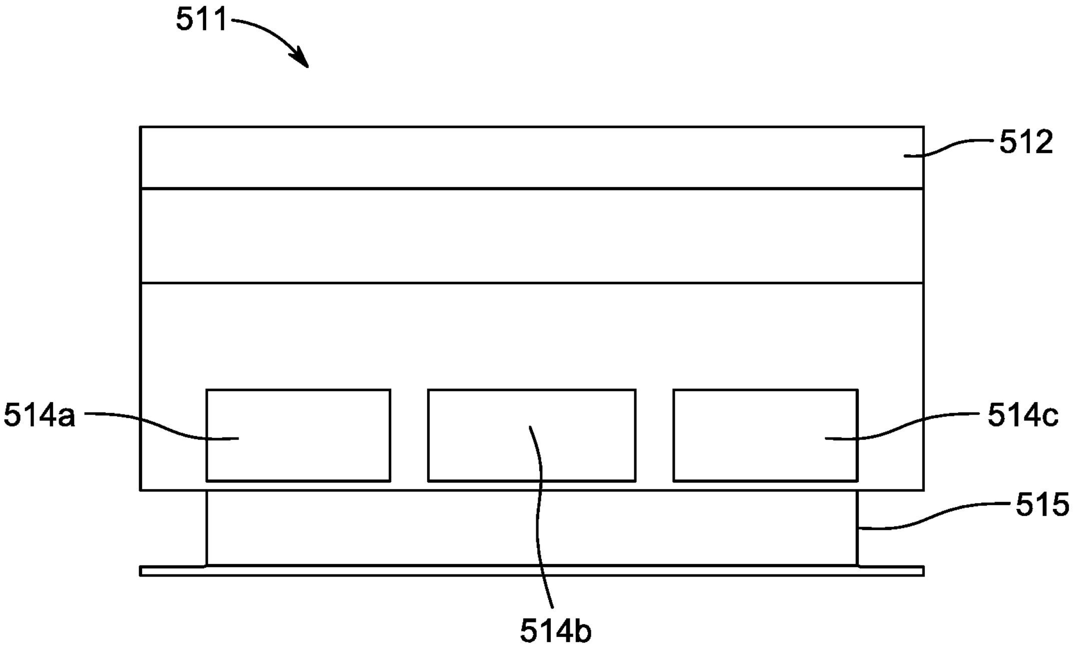
Figure 9A:
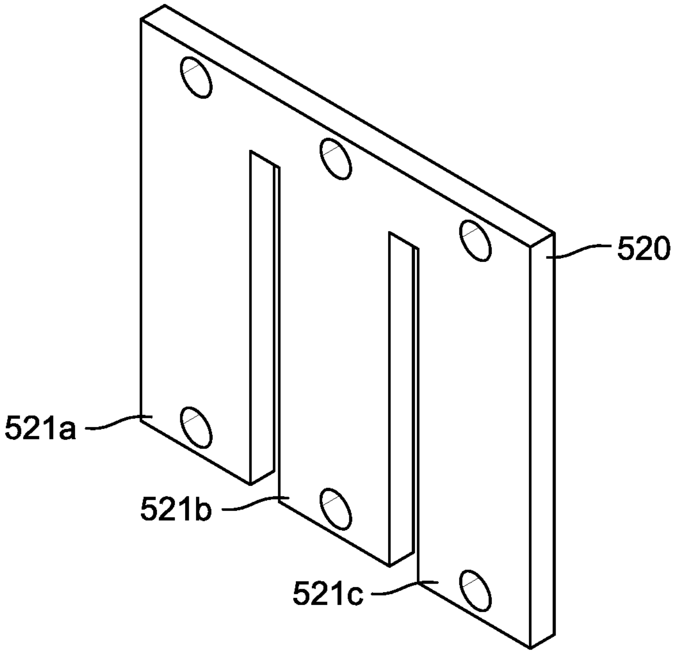
FIGS. 9A-9D show different views of a support plate according to an embodiment.
Figure 9B:
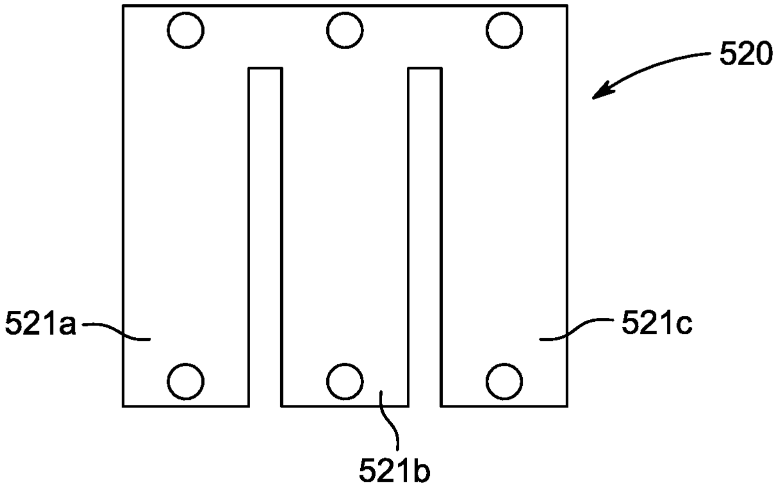
Figure 9C:
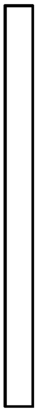
Figure 9D:

FIGS. 6A-6E show illustrative front, back, right, top, and bottom views of galvanometer 500 according to an embodiment. FIG. 7 shows illustrative exploded view of galvanometer 500 according to an embodiment. FIGS. 5A-5C, 6A-6E, 7, 8A-8F, 9A-9D, 10, 11, 12A-12D, 13A-13D, are 14A-14E are collectively referred to in the following discussion of galvanometer 500. Galvanometer 500 can include mirror rotor assembly 510, support plate 530, support plate 540, support plate 550, spacer members 561 and 562. Mirror rotor assembly 510 can include mirror rotor member 511, support plate 520, magnets 522, bearings 523*a-b*, and armature 525. FIGS. 8A-8F shows different views of mirror rotor member 511. Mirror rotor member 511 can include mirror face 512, mounting interfaces 513*a* and 513*b* (not shown), through holes 514*a-c*, and armature retaining portion 515. Bearings 523*a-b* may be secured in (e.g., press fit) respective mounting interfaces 513*a* and 513*b* (not shown). Support plate 520 can include fingers 521*a-c*, each of which are positioned in respective through holes 514*a-c*. FIGS. 9A-9D show different views of support plate 520. In some embodiments, support plate 520 may alternatively be represented by multiple independent plates that are positioned in through holes 514*a-c*. Magnets 522 may be secured to a first side of support plate 520. This first side may face armature 525 and support plate 550. Magnets 522 may be secured on each of fingers 521*a-c*. Armature 525 may be secured around armature retaining region 515. Armature 525 may include a coil winding. For example, the coil winding may be the type typically used in motors. If desired, multiple armatures may be used in galvanometer 500.

Support plate 520, support plate 530, support plate 540, support plate 550, and spacer members 561 and 562 may be collectively referred to as a motor housing, where armature magnets (i.e., magnets 522 and 552) are secured to support plates 520 and 550. Mirror rotor assembly 510 is rotatably coupled to the motor housing, and in particular is coupled to support plates 530 and 540. Support plates 520 and 550 can be parallel to each other, and as a result, magnets 522 and 552 can also be parallel to each other. This parallel framework provides a magnetic field "cage" in which armature 525 exists. That is, armature 525 can exist between magnets 522 and 552. When a drive current signal is applied to armature 525, this causes motor assembly 510 to oscillate within the motor housing.

Figure 10:
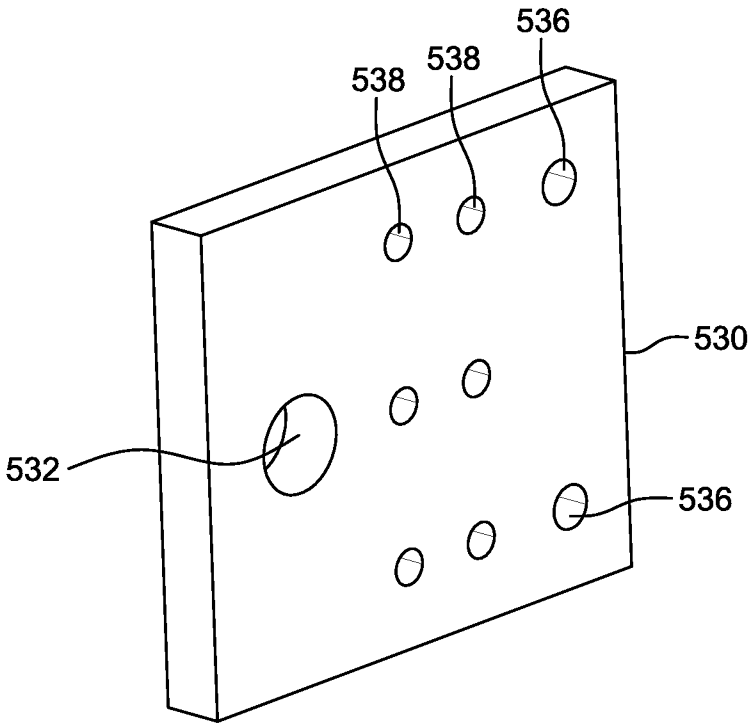
FIGS. 10 and 11 show illustrative side views of different support plates according to various embodiments.

Support plate 530 can include mounting interface 532, cone 533, and various through holes 536 and 538. FIG. 10 shows an illustrative side view of support plate 530. Cone 533 may be secured in mounting interface 532 and is designed to nestle into bearing 523*b*, which is secured in mirror rotor member 511. Support plate 530 is secured to support plate 550 by fasteners or screws that pass through holes 536.

Figure 11:
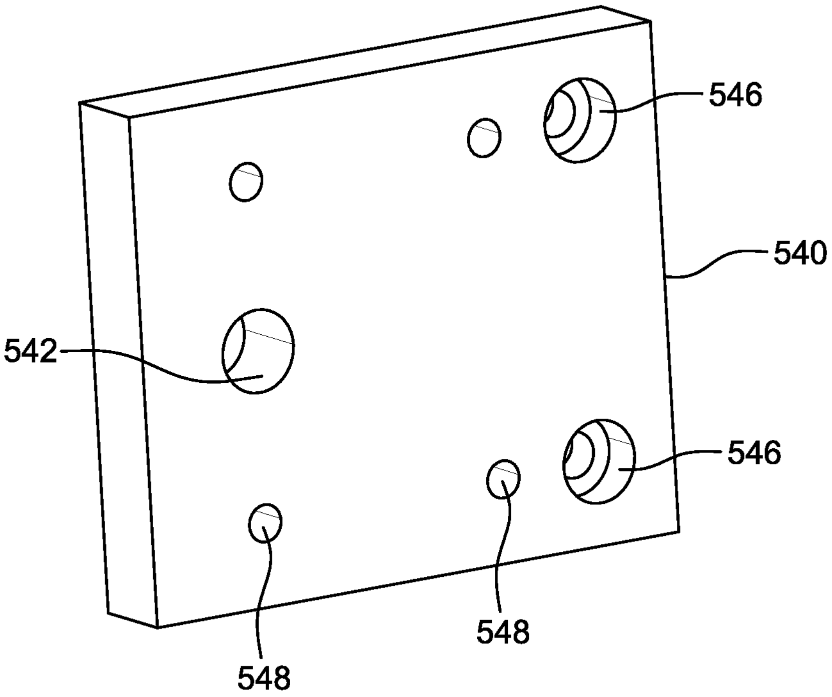
Figure 12A:
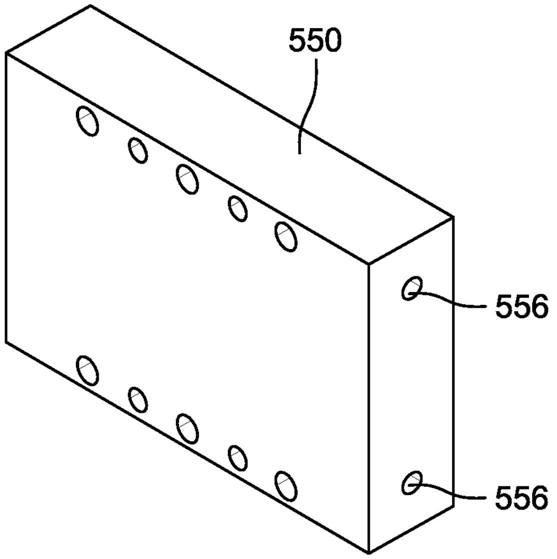
FIGS. 12A-12D show different views of another support plate according to an embodiment.
Figure 12B:
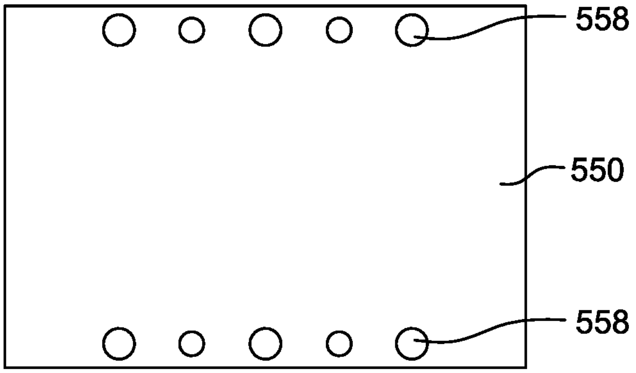
Figure 12C:
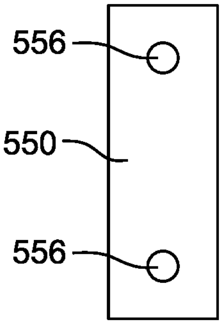
Figure 12D:
Figure 13A:
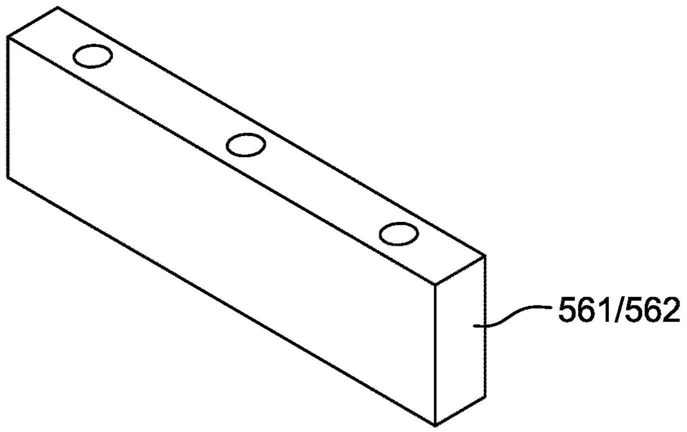
FIGS. 13A-13D shows different views of space members according to an embodiment.
Figure 13B:
Figure 13C:
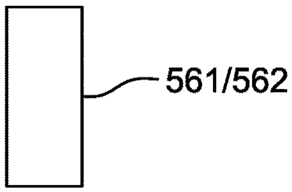
Figure 13D:
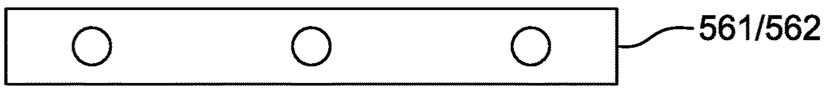

Support plate 540 can include mounting interface 542, cone 543, and various through holes 546 and 548. FIG. 11 shows an illustrative side view of support plate 540. Cone 543 may be secured in mounting interface 542 and is designed to nestle into bearing 523*a*, which is secured in mirror rotor member 511. Support plate 540 is secured to support plate 550 by fasteners or screws that pass through holes 546.

Support plate 550 can include magnets 552 that are secured to a surface of support plate 550 that faces armature 525 and support plate 520. FIGS. 12A-12D show different views of support plate 550. Magnets 552 may be arranged so that they are aligned with magnets 522. Support plate 550 can include cavities 556 and through holes 558. Cavities 556 may receive screws or fasteners being used to secure support plates 530 and 540 to support plate 550. Through holes 558 may allow fasteners or screws to pass there through, to be secured to spacer members 561 and 56.

Spacer members 561 and 562 are secured to support plate 520 and support plate 550 via screws or fasteners (not shown). FIGS. 13A-13D shows different views of space members 561 or 562. Spacer members 561 and 562 may partially enclose armature 525 within galvanometer 500. Support plates 520, 530, 540, and 550, together with spacer members 561 and 562 may form an enclosure or motor housing for magnets 522 and 552 and armature 525. This enclosure may assist in focusing a magnetic field (provided by magnets 522 and 552) that surrounds armature 525. Mirror rotor member 511, support plates 530 and 540 and spacer members 561 and 562 may be constructed from any suitable material such as, for example, aluminum, an aluminum alloy, steel, or a steel alloy. Support plates 520 and 550 should be constructed from magnetic permeable material such as, for example, Cobalt-Iron, or ferritic stainless steel.

Figure 14A:
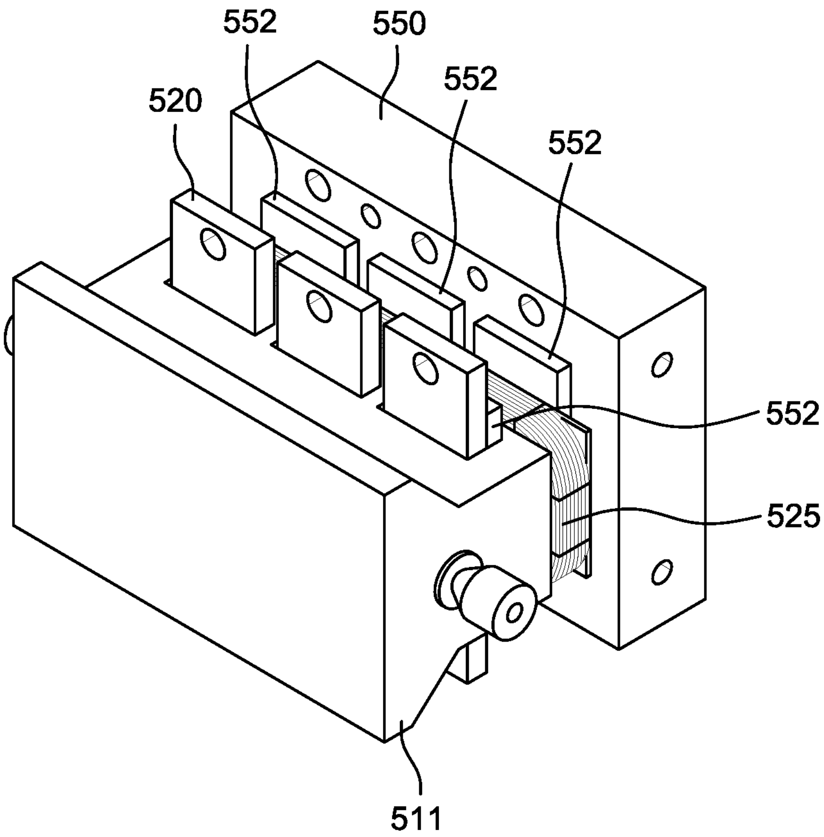
FIGS. 14A-14E show different views of galvanometer without spacer members according to an embodiment.
Figure 14B:
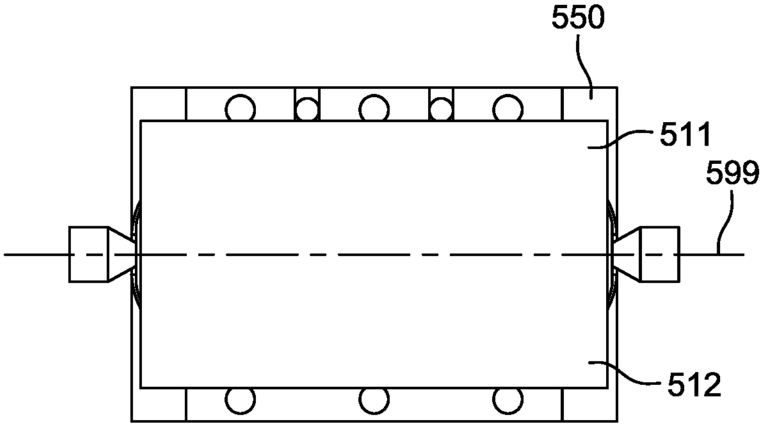
Figure 14C:
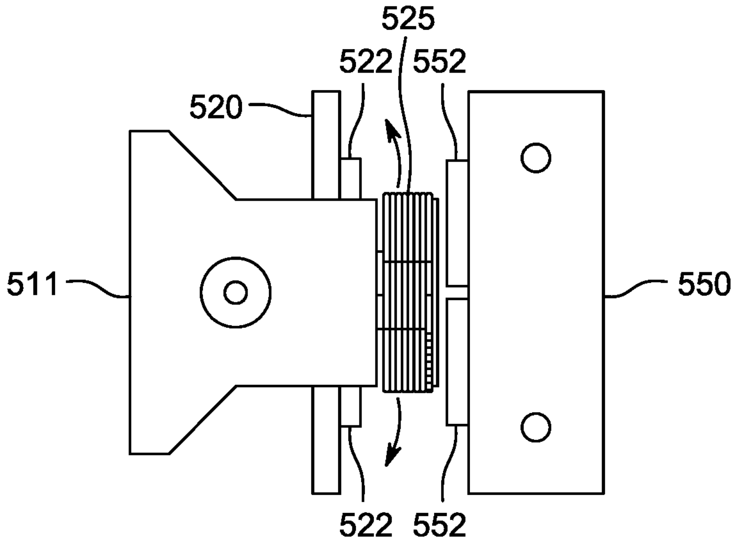
Figure 14D:
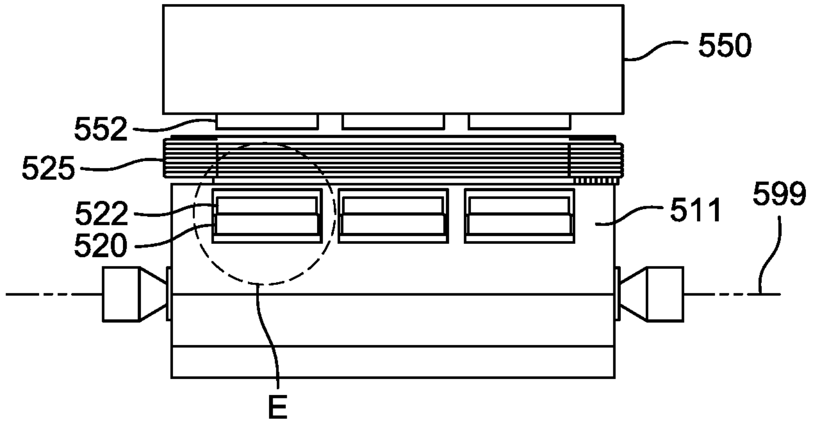
Figure 14E:
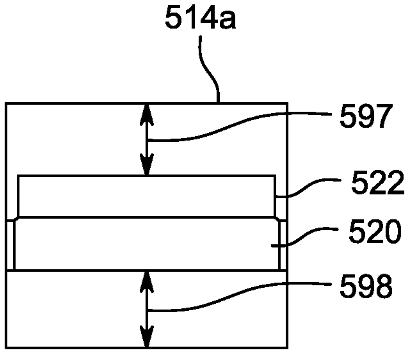

Referring now to FIGS. 14A-14E, which shows different views of galvanometer 500 with spacer members 561 and 562 removed. During use of galvanometer 500, mirror rotor member 511 and armature 525 rotate with respect to support plates 520, 530, 540, and 550, and spacer members 561 and 562 about rotation axis 599, which passes through cone 533, bearing 523*b*, mirror rotor member 511, bearing 523*a*, and cone 543. Support plate 520 remains coplanar with support plate 550 throughout the rotation of mirror rotor member 511. That is, because support plate 520 is secured to support plate 550, directly or via spacer members 561 and 562, the spacing existing among support plate 520 and through holes 514*a-c* enables mirror rotor member 511 to rotate about rotation axis 599. Referring now specifically to FIGS. 14D and 14E, support plate 520 is positioned within through holes 514*a-c* such that a first minimum rotation clearance gap 597 exists between a magnets 522 residing on a first side of support plate 520 and a first surface of each of through holes 514*a-c* and a second minimum rotation clearance gap 598 exists between a second side of support plate 520 and a second surface of each of through holes 514*a-c*. First and second minimum rotation clearance gaps 597 and 598 can enable mirror rotor member 511 to oscillate back and forth (as illustrated in FIG. 14C by the arrows) in response to control signals being provided to armature 525.

Figure 15A:
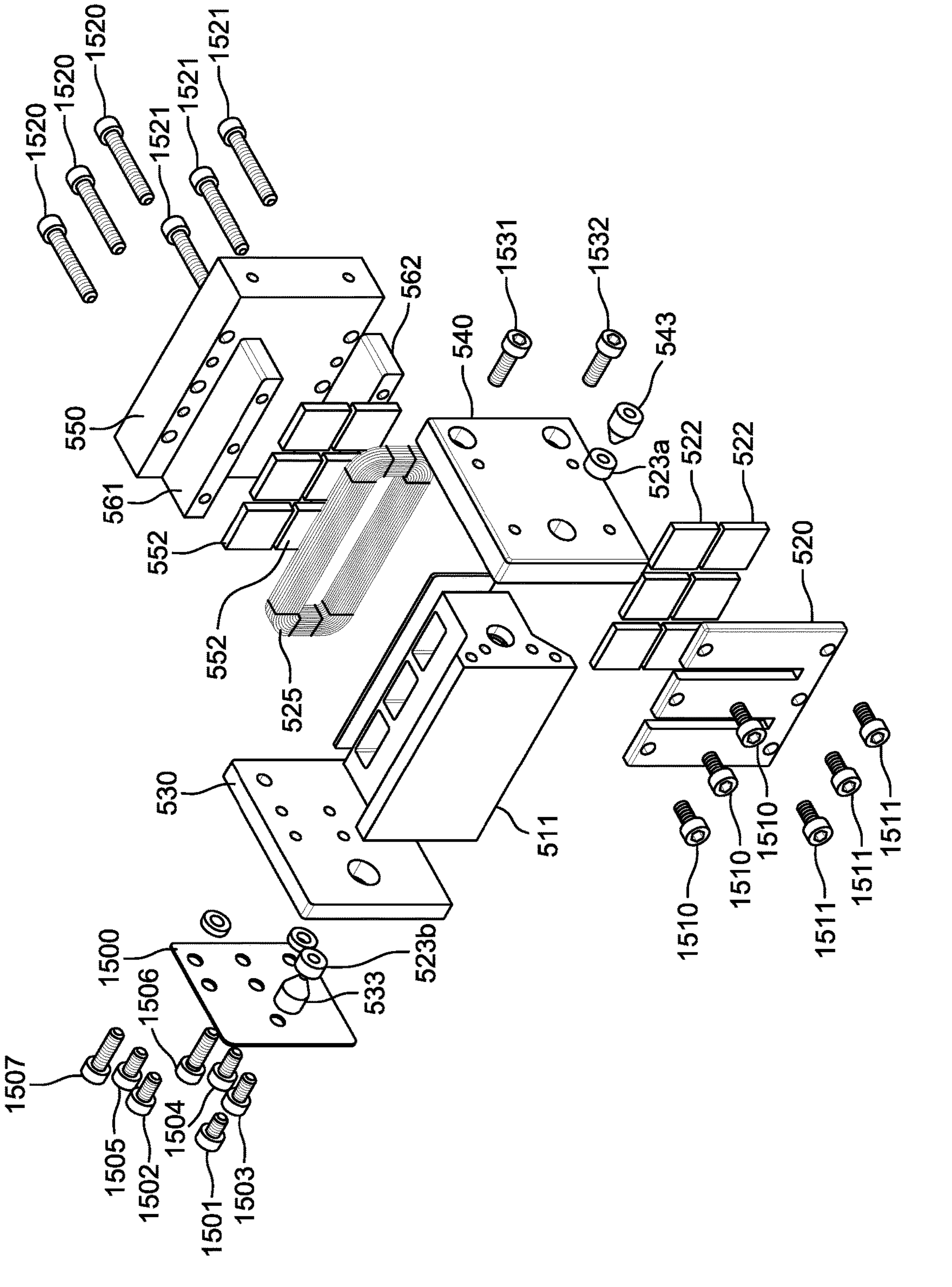
FIG. 15A-15C show different views of a galvanometer with the addition of spring member according to an embodiment.
Figure 15B:
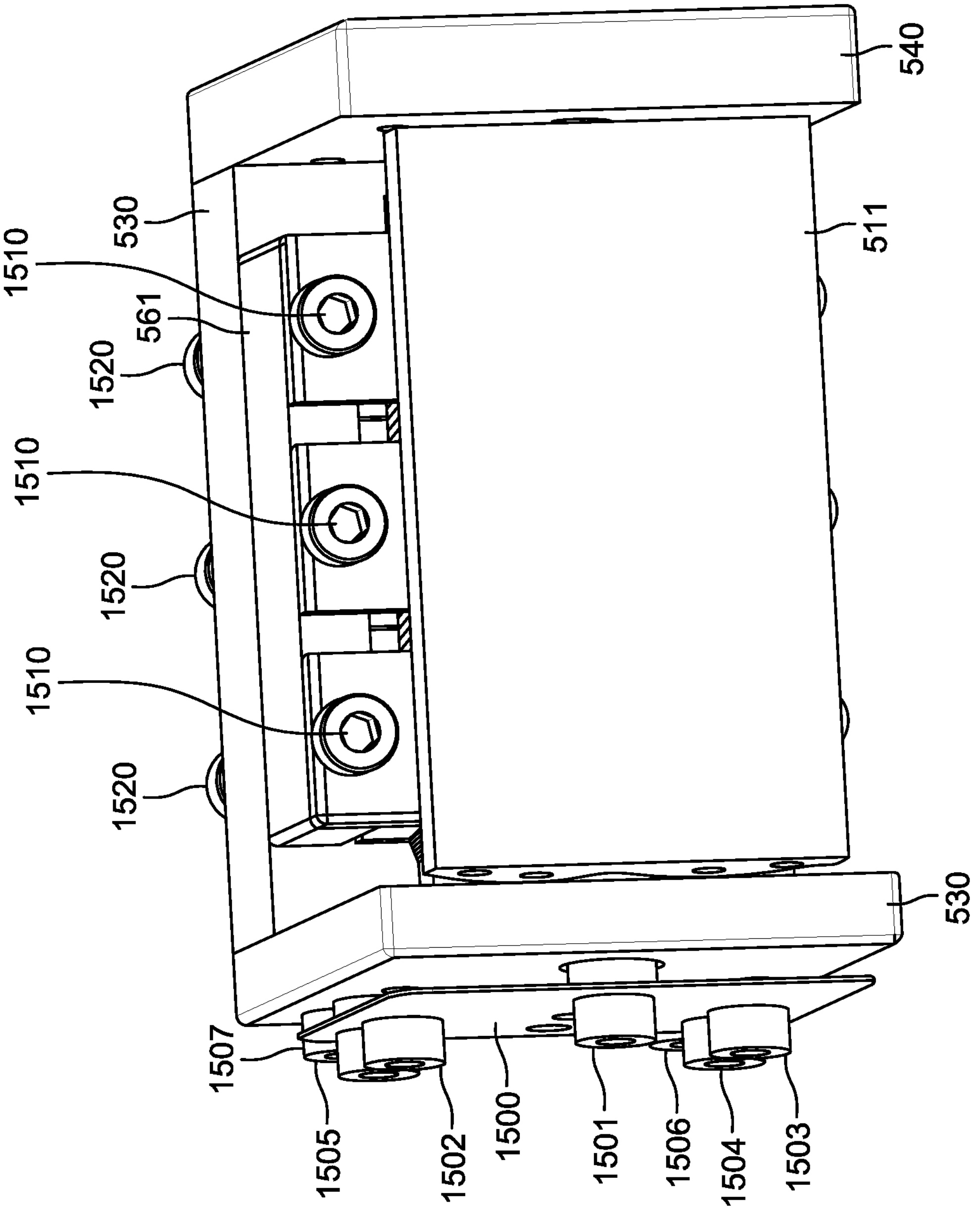
Figure 15C:
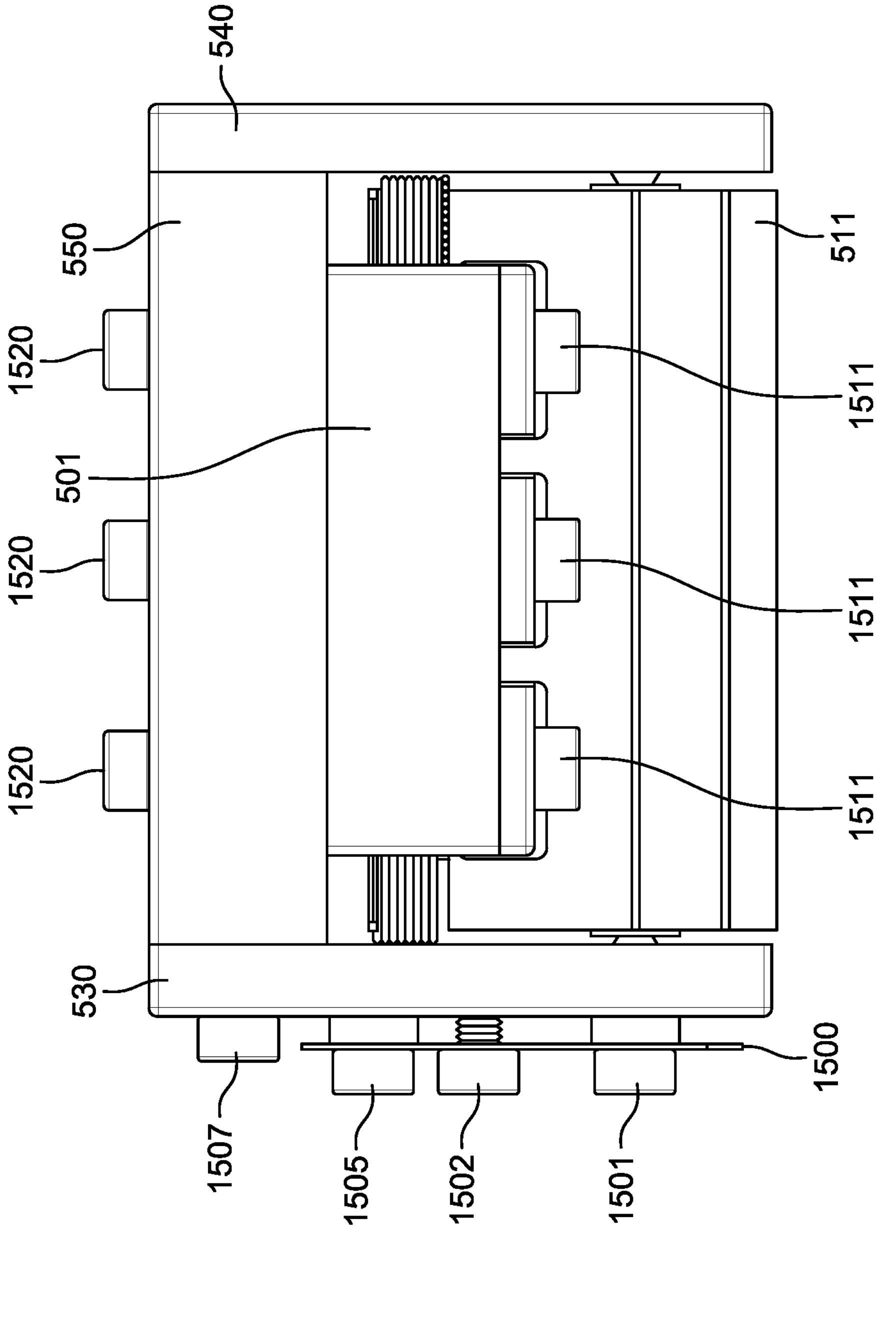

FIG. 15A-15C show different views of galvanometer 500 with the addition of spring member 1500 and several fasteners or screws 1501-1507, 1510, 1511, 1520, 1521, 1531, and 1532 according to an embodiment. Spring member 1500 may be used to adjust tension applied to cone 533 such that it interfaces with bearing 523*b* with a desire amount of force. The depth position of screws 1502 and 1503 can adjust the force applied to cone 533 by spring member 1500. Screws 1510 and 1511 are shown securing support plate 520 to spacer members 561 and 562, respectively. Screws 1520 and 1521 are shown securing support plate 550 to spacer members 561 and 562, respectively. Screws 1531 and 1532 couple support plate 540 to support plate 550. Cone 543 may be held in place with a press fit. Alternatively, a cover plate (not shown) or another spring member may be attached to support plate 540 to hold cone 543 in place.

Figure 16:
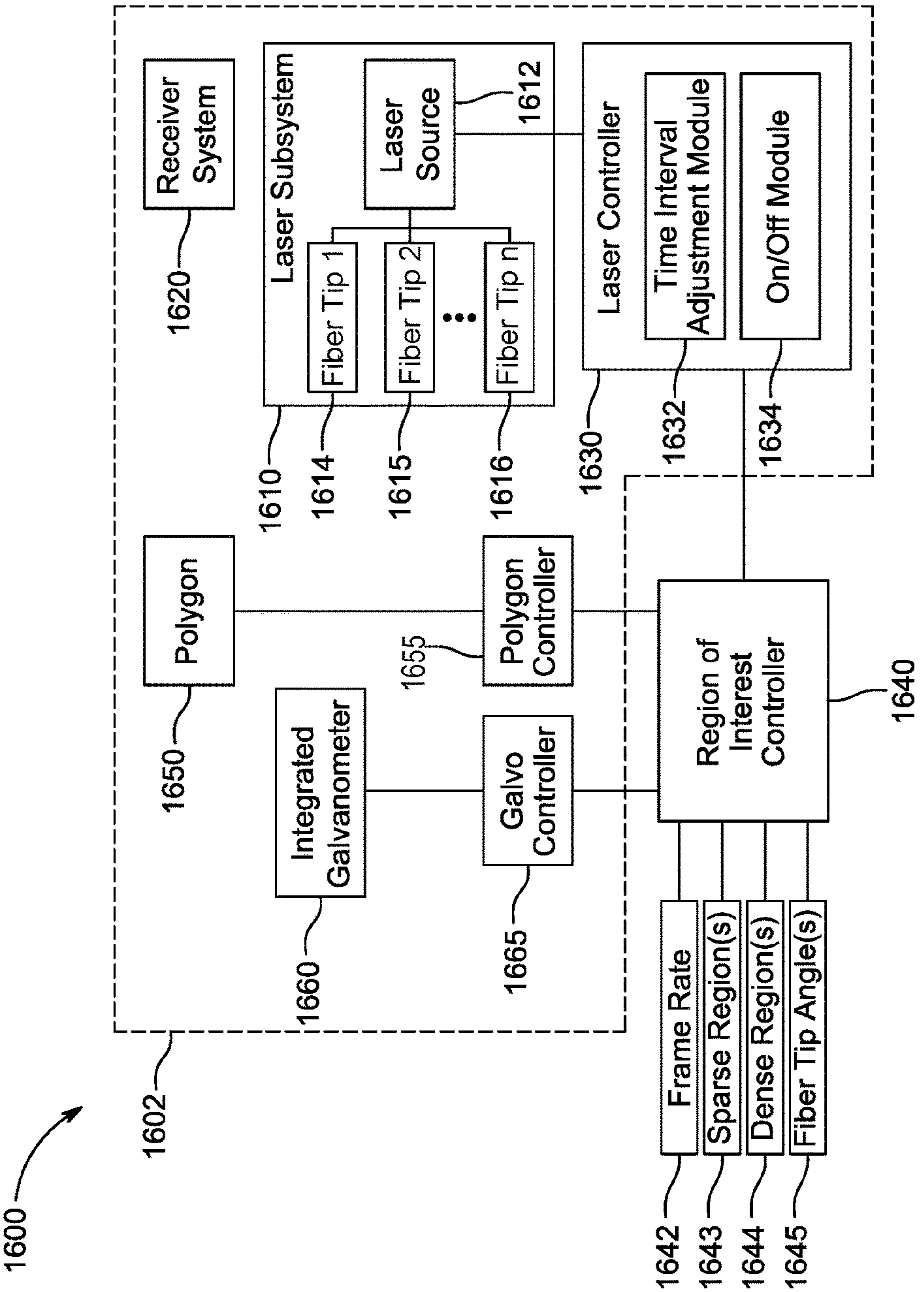
FIG. 16 shows illustrative scanning resolution using multiple fiber tips, a multiple mirror alignment arrangement, or multiple collimator arrangement according to an embodiment.

FIG. 16 shows an illustrative block diagram of LiDAR system 1600 according to an embodiment. LiDAR system 1600 can include laser subsystem 1610, receiver system 1620, laser controller 1630, region of interest controller 1640, polygon structure 1650, polygon controller 1655, integrated mirror motor galvanometer 1660, and galvo controller 1665. LiDAR system 1600 may be contained within one or more housings. In multiple housing embodiments, at least one of the housings may be a temperature controlled environment in which selected portions of LiDAR system 1600 (e.g., laser controller 1630, laser source 1612, controller 1640) are contained therein.

Laser subsystem 1610 may be operative to direct light energy towards galvanometer 1660, which redirects the light energy to polygon structure 1650. Galvanometer 1660 can also be operative to redirect light energy received from polygon structure 1650 to receiver system 1620. Galvanometer 1660 may be moved under the control of controller 1665, which can control the speed and direction of the mirror face of integrated galvanometer 1660. As galvanometer 1660 moves, it causes light being transmitted by laser subsystem 1610 to interface with different portions of polygon structure 1650. Polygon structure 1650 is moving under the control of polygon controller 1655 and is operative to direct the light energy received from galvanometer 1660 in accordance with the field of view parameters of LiDAR system 1600. That is, if LiDAR system 1600 has a field of view with range of z, a lateral angle of x, and vertical angle of y, the range z can be controlled by the power of laser source 1612, the vertical angle y can be controlled by the movement of galvanometer 1660, and the lateral angle x can be controlled by polygon structure 1650. Light energy that is reflected back from objects in the field of view and returns to polygon structure 1650 where it is directed back to galvanometer 1660, which redirects it back to receiver system 1620.

As defined herein, a frame rate may refer to the time it takes for scanning system 1602 to complete one full scan of the FOV. For each frame, scanning system 1602 can obtain data points from each row (or column) of a plurality of rows (or columns) that are defined by the FOV. Each row may correspond to a vertical angle within the vertical range of the FOV. The vertical angle is controlled by galvanometer 1660. As galvanometer 1660 moves, the vertical angle changes, thereby enabling scanning system 1602 to obtain data points from multiple rows within the FOV. Vertical angle resolution refers spacing between adjacent rows of data points. An increase in vertical angular resolution corresponds to denser spacing between adjacent rows, and such an increase can be achieved by decreasing the delta of the vertical angles between adjacent vertical angles. The delta between adjacent vertical angels can be decreased by slowing down the movement of galvanometer 1660. That is, as the mirror movement speed decreases, the change in the vertical angle delta decreases. A decrease in vertical angular resolution corresponds to sparser spacing between adjacent rows, and such a decrease can be achieved by increasing the vertical angle delta. The delta between adjacent vertical angels can be increased by speeding up the movement of galvanometer 1660. That is, as the galvanometer movement speed increases, the change in the vertical angle delta increases.

The plurality of data points obtained within any row may depend on a horizontal angle within the horizontal range of the FOV. The horizontal range may be controlled by polygon 1650, and the horizontal angle resolution may be controlled by a time interval of successive laser pulses. The time interval is sometimes related to the repetition rate. A smaller time interval can result in increased horizontal angular resolution, and a larger time interval can result in decreased horizontal angular resolution.

The above reference to vertical and horizontal angles and vertical and horizontal angular resolution was made in reference to a system in which galvanometer 1660 controls the vertical angle. It should be understood that galvanometer 1660 can be repurposed to control the horizontal angle and used in a system different than that shown in FIG. 16.

Laser subsystem 1610 can include laser source 1612 and fiber tips 1614-1616. Any number of fiber tips may be used as indicated by the "n" designation of fiber tip 1616. As shown, each of fiber tips 1614-1616 may be associated with laser source 1612. Laser source 1612 may be a fiber laser or diode laser. Fiber tips 1614-1616 may be aligned in a fixed orientation so that the light exiting each tip strikes galvanometer 1660 at a particular location. In some embodiments, fiber tips 1614-1616 can be replaced with a SSMB splitter. The actual orientation may depend on several factors, including, for example, frame rate, mirror movement and speed, polygon speed, ROIs, repetition rate, etc. Additional discussion of fiber tips and their characteristics in obtaining additional data points within ROIs is discussed in more detail below.

Receiver system 1620 can include various components such as optics, detectors, control circuitry, and other circuitry. The optics may contain light-transmitting optics that gather laser light returned from mirror 1660. Detectors may generate current or voltage signals when exposed to light energy through the optics. The detectors may be, for example, avalanche photo diodes. The outputs of the detectors can be processed by the control circuitry and delivered to a control system (not shown) to enable processing of return pulses.

Laser controller 1630 may be operative to control laser source 1612. In particular, laser controller 1630 can control power of laser source 1612, can control a repetition rate or time interval of light pulses emitted by laser source 1612 (via time interval adjustment module 1632), and can control pulse duration of laser source 1612. Time interval adjustment module 1632 may be operative to control and/or adjust the repetition rate/time interval of the transmitter pulse of laser subsystem 1610. Time interval adjustment circuitry 1632 can vary the repetition rate/time interval for different regions within the FOV. For example, the repetition rate may be increased for ROIs but may be decreased for areas of FOV that are not of interest. As another example, the time interval can be decreased for ROIs and increased for areas of FOV that are not of interest.

Region of Interest controller 1640 may be operative to control LiDAR system 1600 to obtain additional data points for the ROIs. That is, when LiDAR system 1600 is scanning a ROI, ROI controller 1640 may cause system 1600 to operate differently than when system 1600 is not scanning a ROI. ROI controller 1640 may control operation of laser controller 1630, polygon controller 1655, and mirror controller 1665 to alter the quantity of data being obtained by system 1600. ROI controller 1640 may receive several inputs that dictate how it should control the scanning subsystem 1602. The inputs can include, for example, frame rate 1642, sparse regions 1643, dense regions 1644, distance range, or any other suitable input. Frame rate 1642 may specify the frequency at which scanning subsystem 1602 completes a FOV scan. Sparse and dense regions 1643 and 1644 may provide specific locations of ROIs. For example, dense regions 1644 may correspond to ROIs and sparse regions 1643 may correspond to regions within the FOV that are not ROIs. Fiber tip angles 1645 may be used as a design constraint within which scanning sub-system 1602 operates in order to optimally perform scanning.

Polygon structure 1650 may be constructed from a metal such as aluminum, plastic, or other material that can have a polished or mirrored surface. Polygon structure 1650 may be selectively masked to control the lateral dispersion of light energy being projected in accordance with the field of view of scanning subsystem 1602. Polygon structure 1650 can include a number of facets to accommodate a desired horizontal field of view (FOV). The facets can be parallel or non-parallel to its symmetric axis. Polygon structure 1650 is operative to spin about an axis in a first direction at a substantially constant speed. The shape of polygon structure 1650 can be trimmed (e.g., chop off the sharp corner or tip to reduce overall weight or required geometry envelope, chamfer the sharp edge to reduce air resistance) for better operational performance.

Integrated mirror motor galvanometer 1660 may be a galvanometer according to embodiments discussed herein (e.g., galvanometer 500). In some embodiments, the mirror face of mirror rotor can be a single plane or multi-plane mirror that redirect light energy emitted by laser source 1612 to polygon 1650. The single plane mirror may provide higher resolutions at the top and bottom portions of the vertical field of view than the middle portion, whereas the multi-plane mirror may provide higher resolution at a middle portion of the vertical field of view than the top and bottom portions. Varying the oscillation speed within an oscillation cycle can enable scanning subsystem 1602 to acquire sparse or dense data points within the FOV. For example, if dense data points are required (for a particular ROI), the movement speed may be reduced, and if sparse data points are required (for non-ROIs), the movement speed may be increased.

Figure 17:
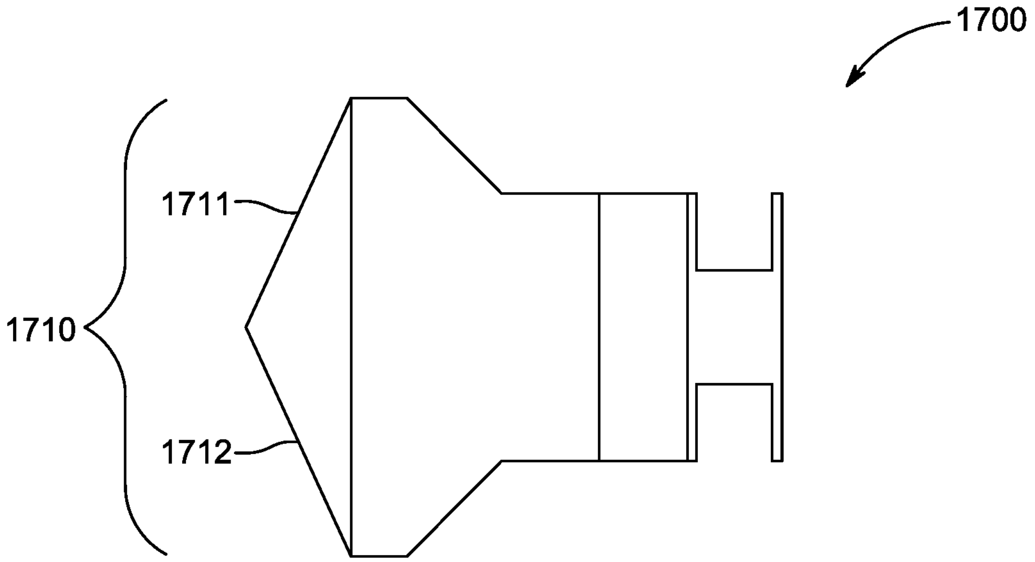
FIG. 17 shows multi-plane mirror rotor according to an embodiment.

FIG. 17 shows an illustrative view of a multi-plane mirror rotor 1700 according to an embodiment. Mirror rotor 1700 has a multi-plane face 1710 that includes face 1711 and face 1712. Mirror rotor 1700 can be used in place of mirror rotor member 511.

It is believed that the disclosure set forth herein encompasses embodiments of multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Moreover, any processes described with respect to FIGS. 1-17, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, optical data storage devices, and any non-transitory computer-readable mediums. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. An integrated mirror motor galvanometer comprising:
- a first support plate comprising a first mounting interface;
- a second support plate comprising a second mounting interface;
- a third support plate comprising a first plurality of magnets;
- a fourth support plate comprising a second plurality of magnets, wherein the first, second, and fourth support plates are secured to the third support plate;
- a first spacer member and a second spacer member that couple the third support plate to the fourth support plate; and
- a mirror rotor assembly secured to the first mounting interface and the second mounting interface, wherein the mirror rotor assembly oscillates about a rotation axis with respect to the first, second, third, and fourth support plates, the mirror rotor assembly comprising:
  - a mirror rotor member comprising a mirror face; and
  - an armature that causes the mirror rotor assembly to oscillate about the rotation axis when a drive current is applied thereto.

2. The integrated mirror motor galvanometer of claim 1, wherein the third and fourth support plates are parallel to each other, and wherein the first plurality of magnets and the second plurality of magnets provide a magnetic field that surrounds the armature.

3. The integrated mirror motor galvanometer of claim 1, wherein the mirror rotor member comprises a plurality of through holes, and wherein the fourth support plate comprises a finger support structure including a plurality of finger members, wherein each finger member of the plurality of finger members is positioned in a respective one of the plurality of through holes, and wherein the second plurality of magnets are arranged on the plurality of finger members.

4. The integrated mirror motor galvanometer of claim 3, wherein a first minimum rotation clearance gap exists between the second plurality of magnets residing on a first side of the fourth support plate and a first surface of each of the plurality of through holes, and wherein a second minimum rotation clearance gap exists between a second side of the fourth support plate and a second surface of each of the plurality of through holes.

5. The integrated mirror motor galvanometer of claim 1, wherein the mirror rotor member comprises:
- a third mounting interface that interfaces with the first mounting interface; and
- a fourth mounting interface that interfaces with the second mounting interface,
- wherein the rotational axis passes through the first, second, third, and fourth mounting interfaces.

6. The integrated mirror motor galvanometer of claim 5, wherein the third mounting interface comprises a first bearing and the fourth mounting interface comprises a second bearing, and wherein the first mounting interface comprises a first cone configured to interface with the first bearing and the second mounting interface comprises a second cone configured to interface with the second bearing.

7. The integrated mirror motor galvanometer of claim 1, wherein the armature comprises a coil winding.

8. A light detection and ranging (LiDAR) system, comprising:
- a beam steering system comprising an integrated mirror motor galvanometer, wherein the integrated mirror motor galvanometer comprises:
- a first support plate comprising a first mounting interface;
- a second support plate comprising a second mounting interface;
- a third support plate comprising a first plurality of magnets;
- a fourth support plate comprising a second plurality of magnets, wherein the first, second, and fourth support plates are secured to the third support plate;
- a first spacer member and a second spacer member that couple the third support plate to the fourth support plate; and
- a mirror rotor assembly secured to the first mounting interface and the second mounting interface, wherein the mirror rotor assembly oscillates about a rotation axis with respect to the first, second, third, and fourth support plates, the mirror rotor assembly comprising:
  - a mirror rotor member comprising at least one mirror face; and
  - an armature that causes the mirror rotor assembly to oscillate about the rotation axis when a drive current is applied thereto;

a laser source that supplies a plurality of light pulses to the beam steering system, wherein the beam steering system directs the plurality of light pulses in accordance with a field of view; and a controller coupled to the beam steering system and the laser source, the controller operative to coordinate movement speed of the integrated mirror motor galvanometer with the plurality of light pulses supplied by the laser source.

9. The LiDAR system of claim 8, wherein the integrated mirror motor galvanometer comprises:

a motor housing comprising a first plurality of magnets and a second plurality of magnets, wherein the armature is positioned in between the first plurality of magnets and the second plurality of magnets.

10. The LiDAR system of claim 9, wherein the controller is operative to control application of a current signal to the armature to control rotational movement of the mirror rotor member.

11. The LiDAR system of claim 9, wherein a rotational movement of the mirror rotor member ranges between a first angle and a second angle.

12. The LiDAR system of claim 9, wherein the at least one mirror face is a single planar surface.

13. The LiDAR system of claim 9, wherein the at least one mirror face comprises two planar surfaces.

14. An integrated mirror motor galvanometer comprising:

a motor housing comprising a first plurality of magnets and a second plurality of magnets;

a mirror rotor assembly rotatably coupled to the motor housing and comprising:

a mirror rotor member comprising at least one mirror face; and a plurality of through holes, wherein portions of the motor housing that secure the second plurality of magnets thereto are positioned in respective ones of the plurality of through holes; and an armature coupled to the mirror rotor member and is positioned in between the first plurality of magnets and the second plurality of magnets.

15. The integrated mirror motor galvanometer of claim 14, wherein minimum gap separation exists between the second plurality of magnets and the plurality of through holes to enable the mirror rotor assembly to oscillate within the motor housing.

16. The integrated mirror motor galvanometer of claim 14, wherein the motor housing comprises:

a first support plate comprising a first mounting interface coupled to the mirror rotor assembly;

a second support plate comprising a second mounting interface coupled to the mirror rotor assembly;

a third support plate comprising the first plurality of magnets; and a fourth support plate comprising the second plurality of magnets, wherein the first, second, and fourth support plates are secured to the third support plate.

17. The integrated mirror motor galvanometer of claim 16, wherein the motor housing further comprises:

a first spacer member and a second spacer member that couple to the third support plate to the fourth support plate.

18. The integrated mirror motor galvanometer of claim 14, wherein the first plurality of magnets and the second plurality of magnets are parallel to each other.

19. An integrated mirror motor galvanometer comprising:

a first support plate comprising a first mounting interface;

a second support plate comprising a second mounting interface;

a third support plate comprising a first plurality of magnets;

a fourth support plate comprising:

a second plurality of magnets, a finger support structure including a plurality of finger members, wherein the second plurality of magnets are arranged on the plurality of finger members, wherein the first, second, and fourth support plates are secured to the third support plate; and a mirror rotor assembly secured to the first mounting interface and the second mounting interface, wherein the mirror rotor assembly oscillates about a rotation axis with respect to the first, second, third, and fourth support plates, the mirror rotor assembly comprising:

a mirror rotor member comprising:

a mirror face; and a plurality of through holes, wherein each finger member of the plurality of finger members is positioned in a respective one of the plurality of through holes; and an armature that causes the mirror rotor assembly to oscillate about the rotation axis when a drive current is applied thereto.

* * * * *